(12) United States Patent
Synesiou et al.

(10) Patent No.: US 9,280,796 B2
(45) Date of Patent: Mar. 8, 2016

(54) SYSTEM AND METHOD FOR RESOURCE MANAGEMENT

(76) Inventors: Andreas Joanni Synesiou, St. Paul, MN (US); John Andrew Synesiou, San Diego, CA (US)

( * ) Notice: Subject to any disclaimer, the term of this patent is extended or adjusted under 35 U.S.C. 154(b) by 1290 days.

(21) Appl. No.: 13/006,690

(22) Filed: Jan. 14, 2011

(65) Prior Publication Data

US 2011/0173109 A1 Jul. 14, 2011

Related U.S. Application Data

(63) Continuation of application No. 11/860,974, filed on Sep. 25, 2007, now Pat. No. 7,873,441.

(60) Provisional application No. 60/826,857, filed on Sep. 25, 2006.

(51) Int. Cl.
| | |
|---|---|
| *G06Q 30/00* | (2012.01) |
| *G06F 1/28* | (2006.01) |
| *G06Q 50/06* | (2012.01) |
| *G06Q 10/00* | (2012.01) |
| *G06Q 10/06* | (2012.01) |
| *G06Q 20/10* | (2012.01) |
| *G06Q 30/04* | (2012.01) |
| *G06Q 40/00* | (2012.01) |

(52) U.S. Cl.
CPC .............. *G06Q 50/06* (2013.01); *G06Q 10/00* (2013.01); *G06Q 10/06* (2013.01); *G06Q 20/102* (2013.01); *G06Q 30/04* (2013.01); *G06Q 40/12* (2013.01)

(58) Field of Classification Search
CPC ............. G05B 19/042; G05B 19/0421; G05B 19/052; G06F 1/26; G06F 1/28; Y04S 20/12; Y04S 20/248; G06Q 50/06; G06Q 10/00; G06Q 40/12; G06Q 20/102; G06Q 10/06; G06Q 30/04
USPC ............ 700/20, 22, 286, 291, 295, 296, 297; 705/412
See application file for complete search history.

(56) References Cited

U.S. PATENT DOCUMENTS

| | | | |
|---|---|---|---|
| 5,544,036 A | 8/1996 | Brown et al. | |
| 5,761,083 A | 6/1998 | Brown et al. | |
| 5,927,598 A | 7/1999 | Broe | |
| 5,974,552 A | 10/1999 | Lim et al. | |
| 6,487,509 B1 | 11/2002 | Aisa | |
| 6,584,364 B1 | 6/2003 | Iwamoto | |
| 6,671,585 B2 * | 12/2003 | Lof et al. | 705/36 R |
| 6,732,019 B2 * | 5/2004 | Spool et al. | 700/291 |

(Continued)

*Primary Examiner* — Charles Kasenge
(74) *Attorney, Agent, or Firm* — Dorsey & Whitney LLP; Stuart R. Hemphill, Esq.

(57) ABSTRACT

A system uses an intelligent load controller for managing use of a consumable resource at an associated load. The controller has a resource measuring component for measuring the rate of use of the resource by the associated load, including measuring at least one of an instantaneous usage rate and a usage rate over an integration period and a load status component for receiving load status data for the associated load. The controller also has a communication component for receiving control messages from and sending load status messages to other associated controllers; a memory for storing a load control goal set; and a load control computer program responsive to the resource measuring component, the load status component, the control messages from other associated controllers and the load control goal set, to determine a load operating level for, and provide control commands to, the associated load.

11 Claims, 19 Drawing Sheets

(56) References Cited

U.S. PATENT DOCUMENTS

| | | | |
|---|---|---|---|
| 6,778,882 B2* | 8/2004 | Spool et al. | 700/295 |
| 6,868,295 B2 | 3/2005 | Huang | |
| 6,882,904 B1* | 4/2005 | Petrie et al. | 700/295 |
| 6,900,556 B2* | 5/2005 | Provanzana et al. | 307/19 |
| 7,049,932 B2 | 5/2006 | French et al. | |
| 7,127,327 B1* | 10/2006 | O'Donnell et al. | 700/286 |
| 7,237,243 B2 | 6/2007 | Sutton et al. | |
| 7,262,694 B2* | 8/2007 | Olsen et al. | 340/531 |
| 7,274,975 B2* | 9/2007 | Miller | 700/295 |
| 7,711,655 B2* | 5/2010 | Abe et al. | 705/400 |
| 2002/0007388 A1 | 1/2002 | Bannai et al. | |
| 2002/0019758 A1 | 2/2002 | Scarpelli | |
| 2002/0041126 A1* | 4/2002 | Provanzana et al. | 307/48 |
| 2002/0178047 A1 | 11/2002 | Or et al. | |
| 2003/0171851 A1 | 9/2003 | Brickfield et al. | |
| 2003/0233201 A1 | 12/2003 | Horst et al. | |
| 2004/0024494 A1* | 2/2004 | Bayoumi et al. | 700/286 |
| 2004/0027004 A1* | 2/2004 | Bayoumi et al. | 307/43 |
| 2004/0030457 A1* | 2/2004 | Bayoumi et al. | 700/286 |
| 2004/0034484 A1 | 2/2004 | Solomita et al. | |
| 2004/0254899 A1* | 12/2004 | Abe et al. | 705/412 |
| 2005/0116542 A1* | 6/2005 | Kihara et al. | 307/29 |
| 2005/0134430 A1 | 6/2005 | French et al. | |
| 2006/0038672 A1* | 2/2006 | Schoettle | 340/522 |
| 2006/0142961 A1 | 6/2006 | Johnson et al. | |
| 2006/0276938 A1* | 12/2006 | Miller | 700/295 |
| 2009/0240381 A1 | 9/2009 | Lane | |

* cited by examiner

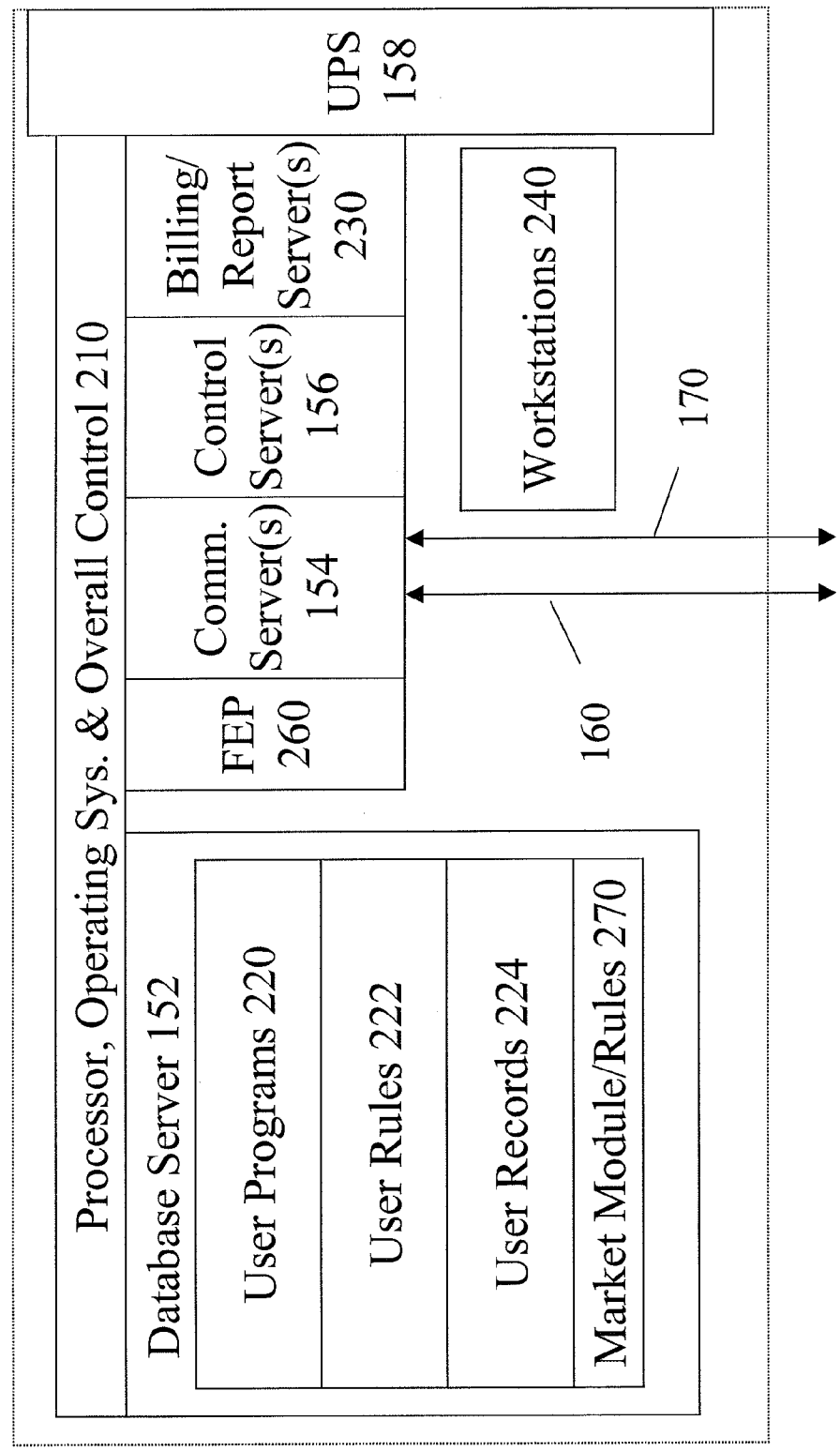
Figure 2 – Control Center

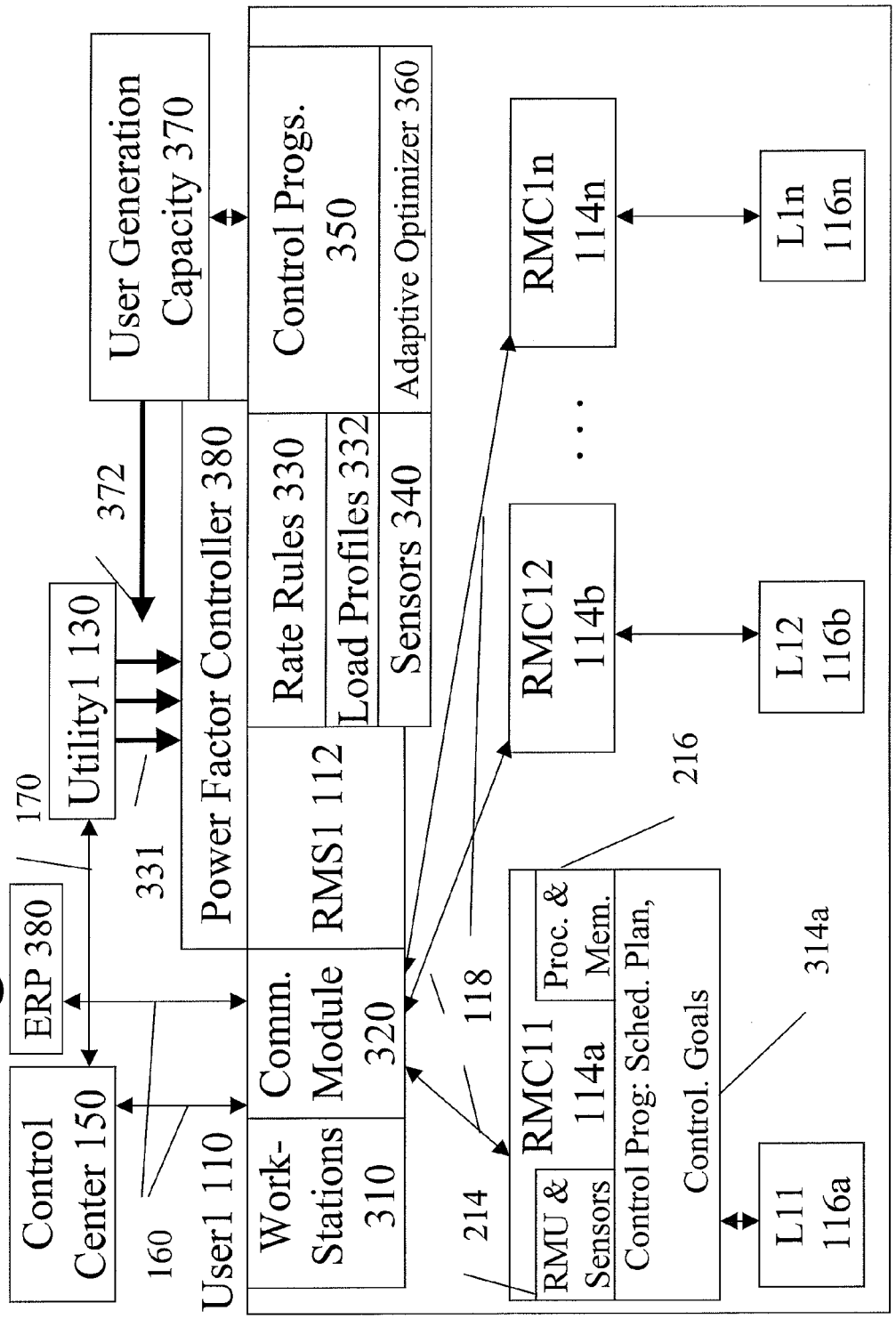
Figure 3a – Customer Site

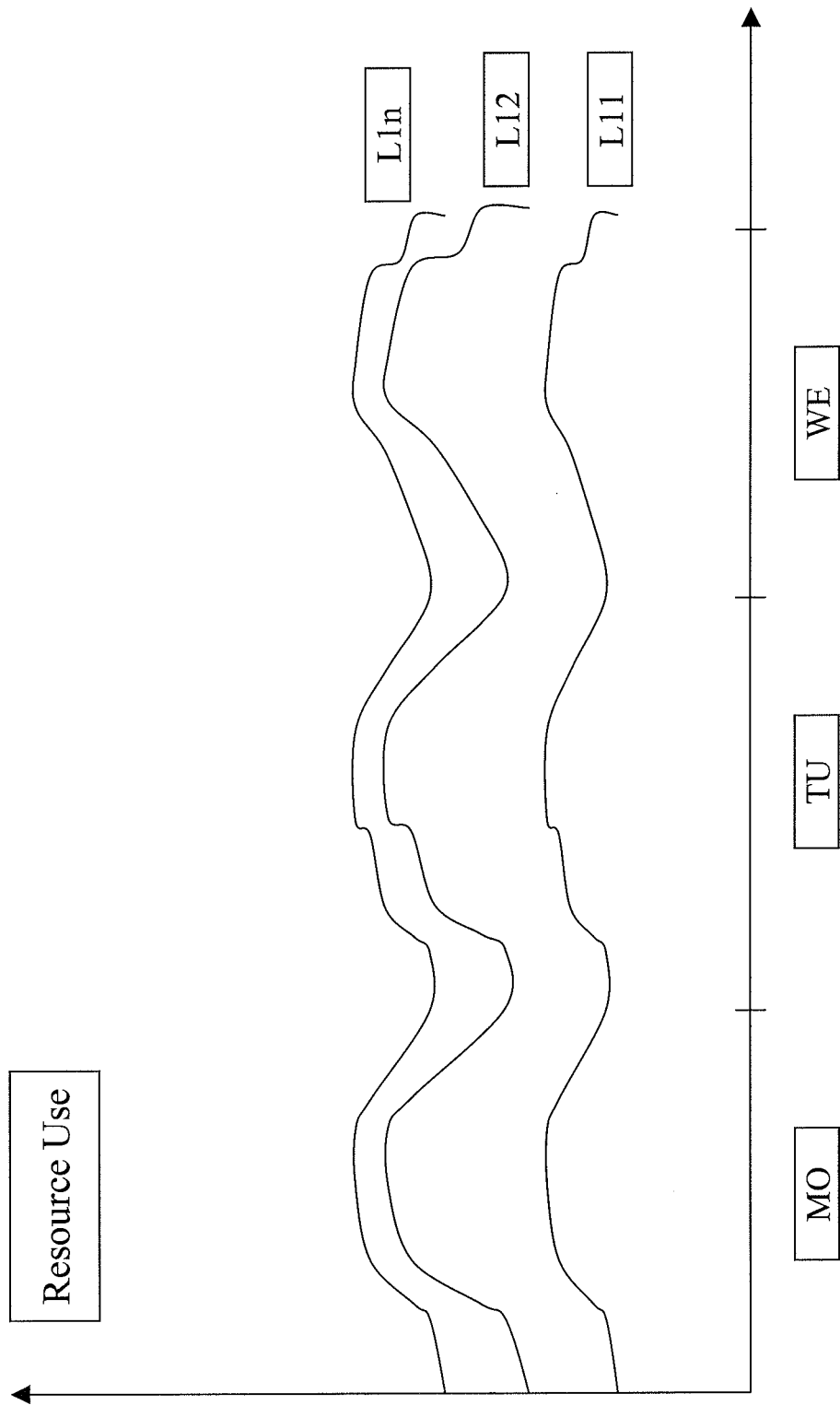
Figure 3b – Load Use Profile Report

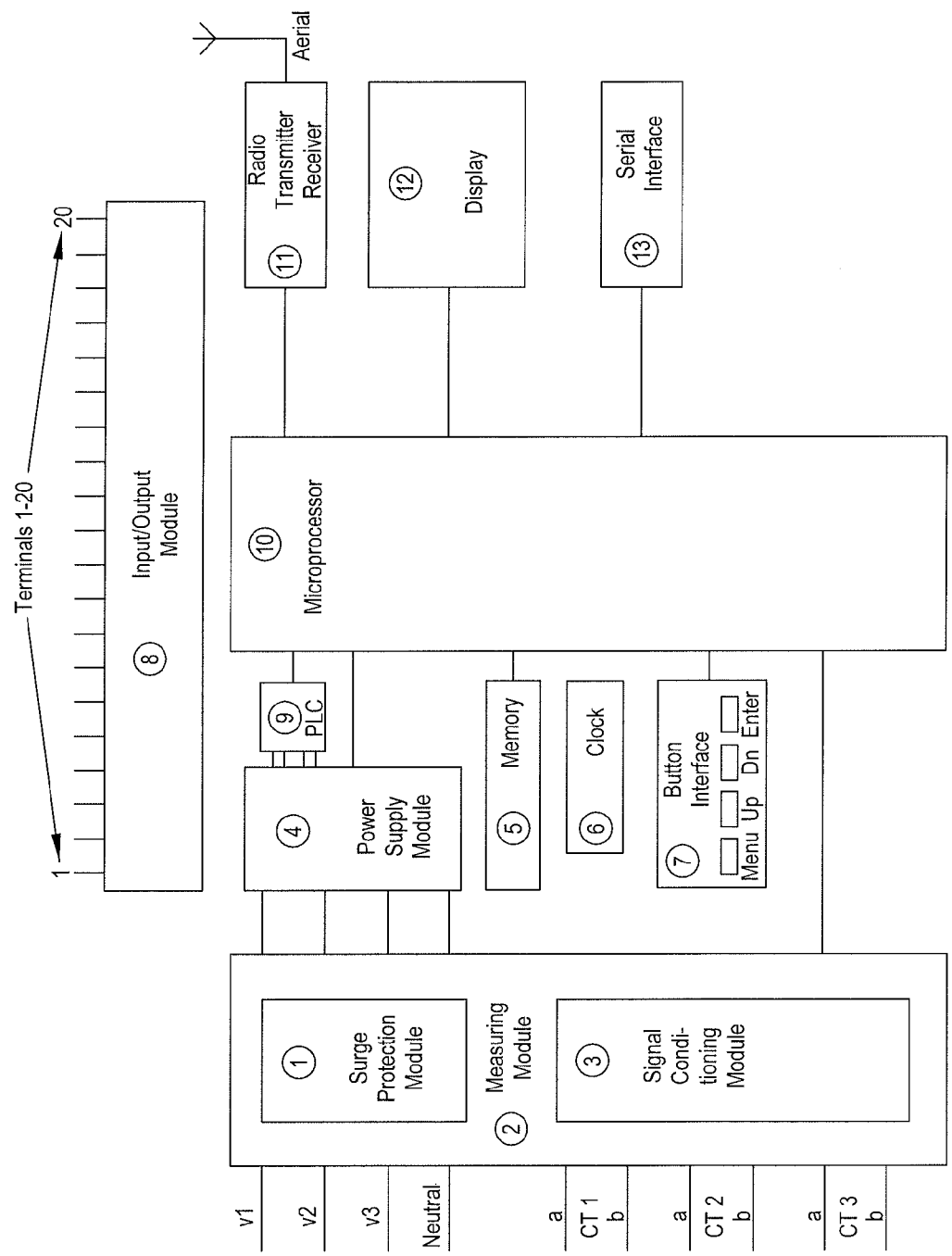

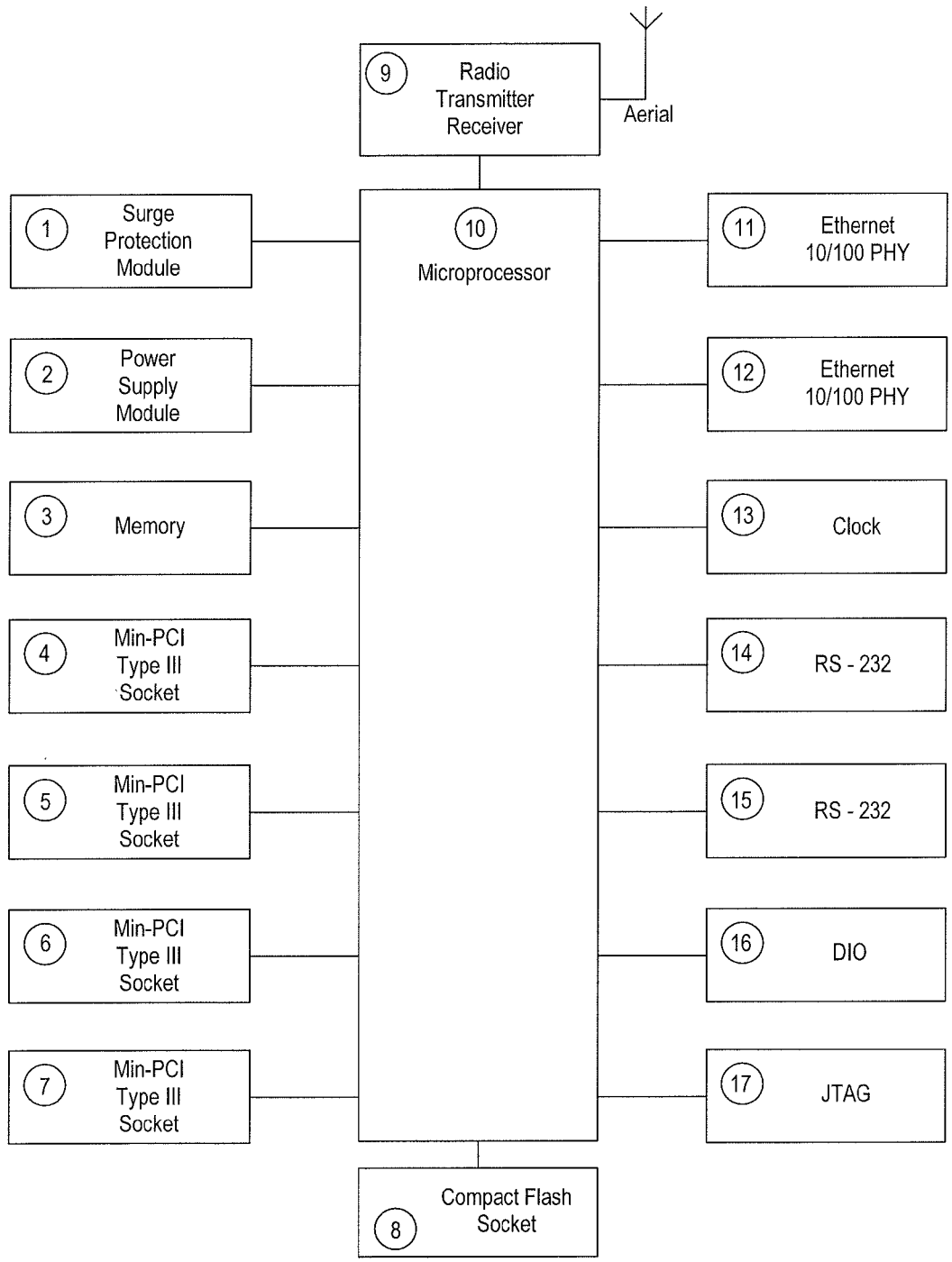
Figure 5 - RMS Implementation
Fig. 2 Remote Management Server (RMS) (Surveyor)

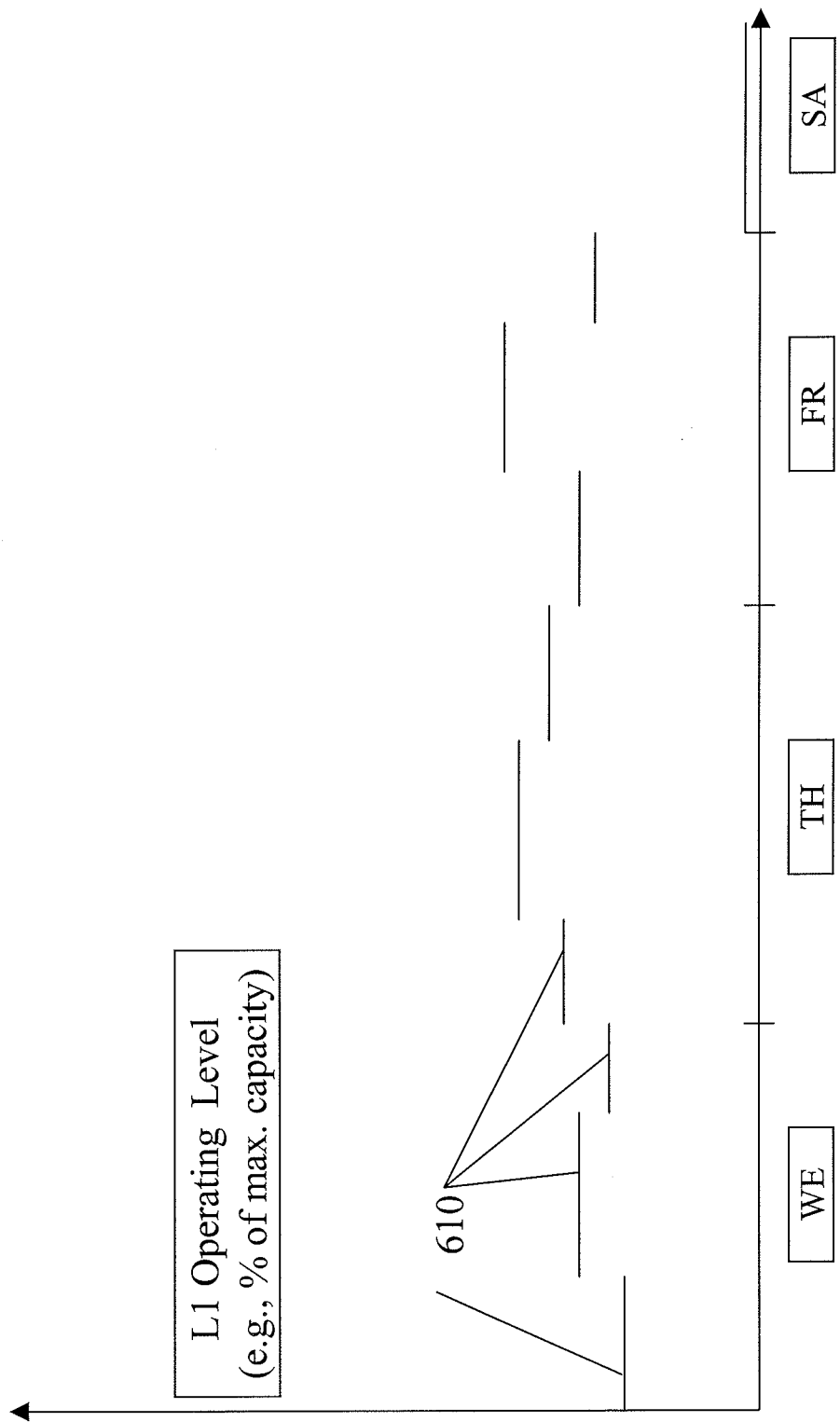
Figure 6a – Load Operating Plan

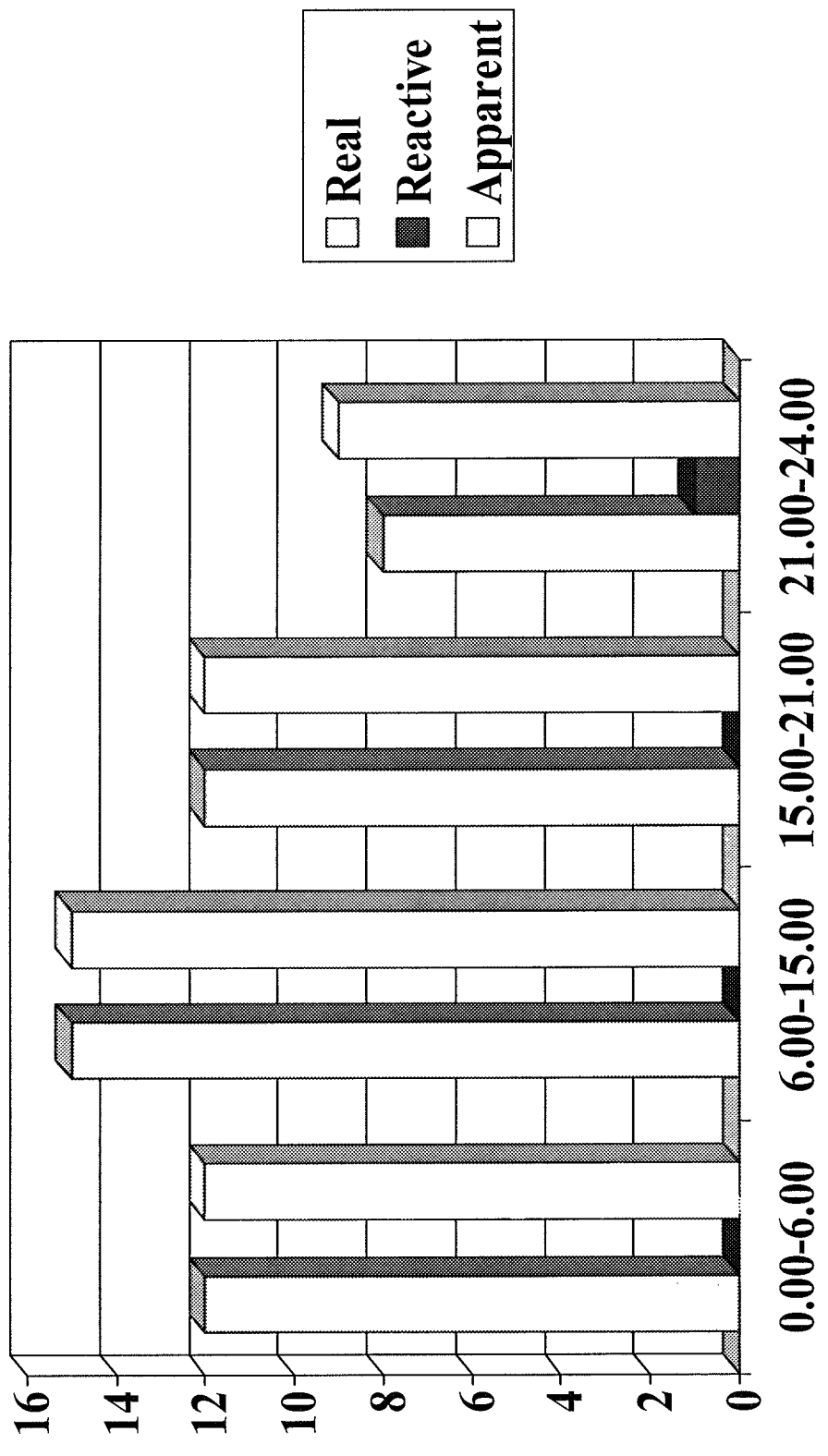

Figure 7 – System Operation

- Analyze user objectives (production/output, comfort), loads and resource use
- Define operating plans and control goals for each system control node and with coordination among nodes
- Configure and install RMC's, RMS's, control center control nodes
- Install operating plans and control goals and related control programs at RMC's, RMS's, control center
- Begin load operations per operating plans
- Measure and monitor resource usage levels against operating plans and control goals at all control levels
- Monitor RMC, RMS and control inputs and control messages
- Adjust load operating levels responsive to measured resource usage levels, inputs and control messages (reduce/increase level, shed, add, introduce generation resources)
- Communicate relevant node status messages and other measurements to other nodes
- Monitor and implement updates to operating plans and control goals

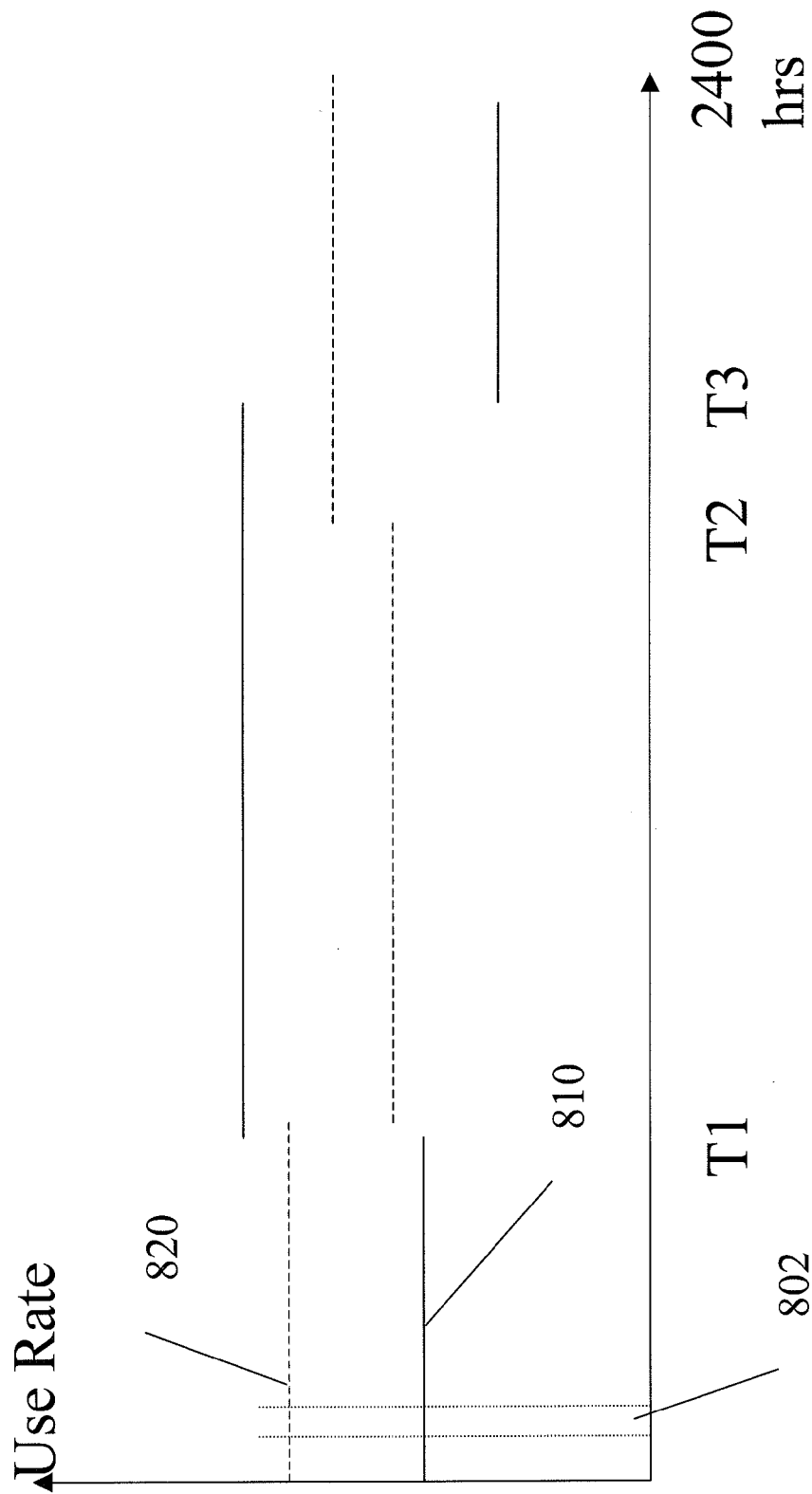
Figure 8 – Displaced Resource Use

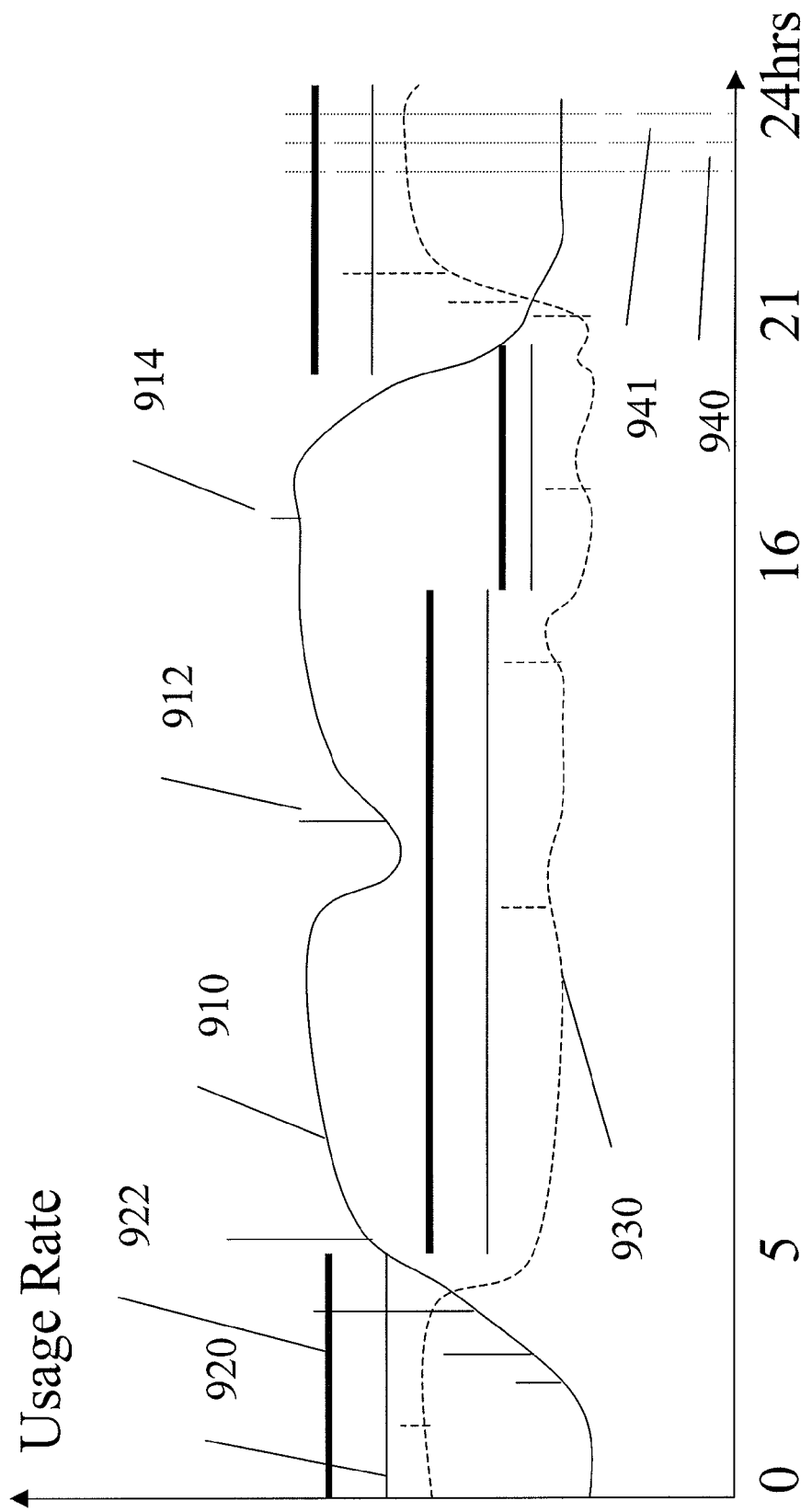
Figure 9 – Usage Rate Chart

FIGURE 11

Load Controller Parameter

| Measured Value(s) | Operating Plan/Control Goal | Communication | Exception(Operating Plan Action) |
|---|---|---|---|
| Power input to Load (real, reactive and apparent over integration period or instantaneous peak) | Integration Period High Limit, Low Limit<br><br>Instantaneous Peak High Limit | to RMS | High Limit (adjust load operating level, shed load normally); Low limit (notice messages) -- Control constraints checked for type B loads<br>Adjust sequence of any additive elements contributing to peak |
| Power factor | Low limit | to RMS | Insert correction equipment (PFC) |
| Supply weakness index | Threshold criterion, indicating imminent failure | local | Shed load on emergency basis |
| Device Temperature (similarly, vibration, speed) | n/a | local only | High Limit; Low Limit (load shutdown, possibly on emergency basis) |
| Device Pressure | n/a | local only | High Limit; Low Limit (local shutdown) |
| Operations Counter | n/a | to RMS | Low Limit (send productivity message); High Limit (send completion message) |
| Output Counter | n/a | to RMS | Low Limit (send productivity message); High Limit (send completion message) |
| Start-up characteristics | n/a | to RMS | Mismatch to specifications or historical profile (repair note; local shutdown); intermediate values may affect operating plan |
| Ambient Temperature | n/a | to RMS | High Limit; Low Limit (local shutdown) |

FIGURE 12

Group Controller Parameters

| Measured/Received Value(s) | Control Goal | Communication | Exception(Action) |
|---|---|---|---|
| Power Input to Group Loads (Summed; real, reactive and apparent over integration period or instantaneous peak) | Integration Period High Limit, Low Limit<br><br>Instantaneous Peak High Limit | to control center | High Limit (adjust one or more load operating levels, shed one or more loads normally, using control messages back to RMC's); Low limit (notice messages to control center)<br>Adjust sequence of additive elements contributing to peak |
| Power Factor (Group) | Low limit | to control center | Low Limit (Insert correction equipment) |
| Ambient Temperature | n/a | local only | High Limit (change scheduling plan) |
| Forecast Temperature | n/a | to RMC | Change scheduling plan |
| SubProcess1 Output Count | n/a | ERP | Low Limit (notice message) |
| SubProcess2 Output Count | n/a | ERP | Low Limit (notice message) |
| Process Output Count | n/a | ERP | Low Limit (notice message) |

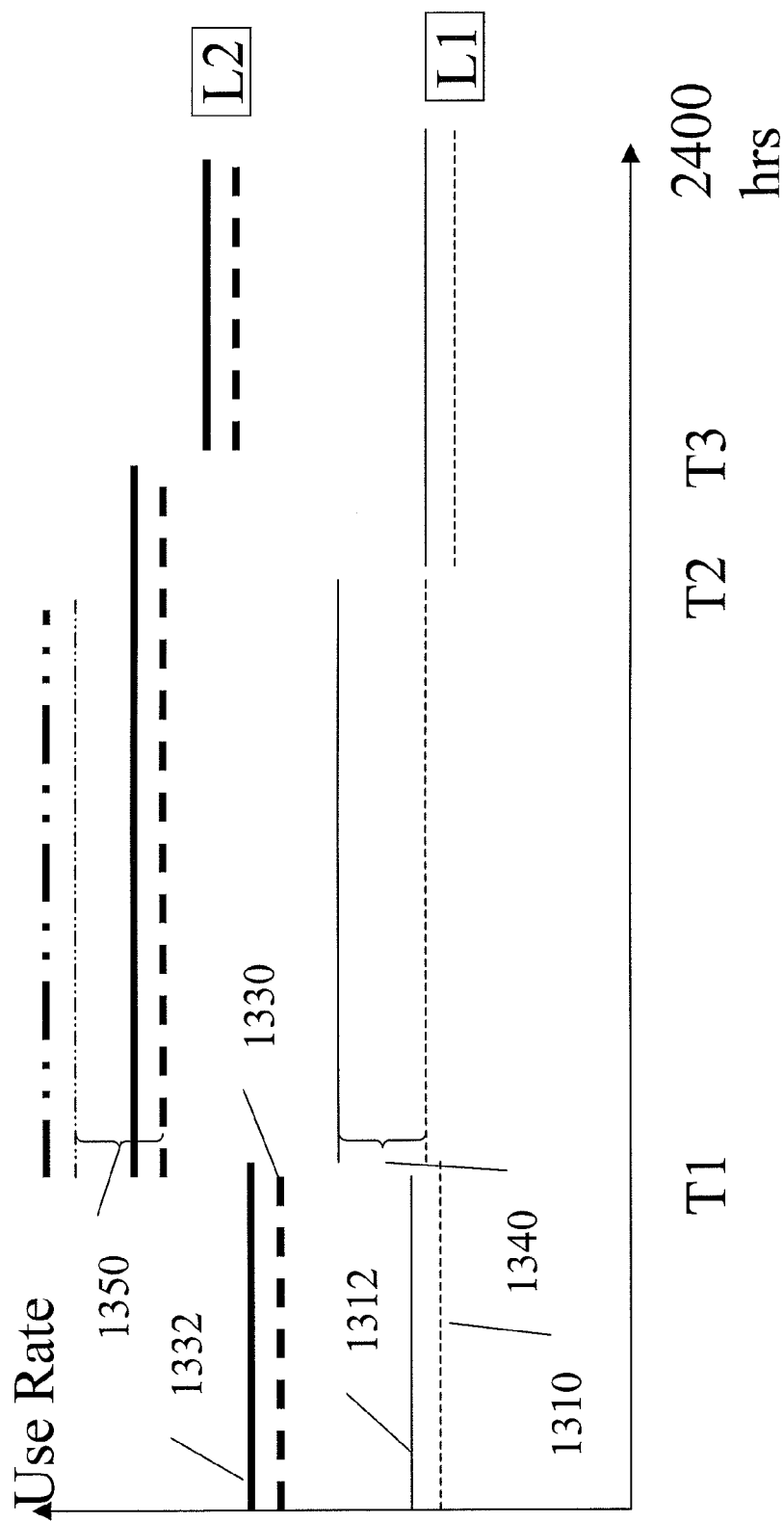
Figure 13 – Transfer of Available Resource Use

Figure 14 – Billing Based on Savings

1. Collect user historical billing information and any adjustment information (weather, production background).
2. Determine baseline levels against which savings will be measured (e.g., total $ or KWH or average KWH)
3. Implement resource management system, and measure resource consumption
4. Receive and review user's current utility bill for resource
5. Compute savings as difference between the current billing (as adjusted) and the relevant historical baseline
6. Pay utility on behalf of user
7. Prepare bill to user in the amount of: utility bill plus X percent of savings computed in step 5

| User Report Functions | User Control/Message Functions |
|---|---|
| Consumption Rates<br>-Select: Load/Group/User Site/User<br>-Current integration period<br>-Prior integration periods<br>-Prior days/weeks/months | Situation Reports<br>-Control goals exceeded<br>-Control goals threatened<br>-Shed/Penalty tariff demand from utility<br>-Situation map by RMS, RMC<br>-Current scheduling plan |
| Tariff Information<br>-Current integration period tariff<br>-Map of tariff periods by week<br>-Projected billings by operating plan/time period | User control options<br>-Select Situation<br>-Select load<br>-Select situation predictive analysis: shed vs. penalty for defined period<br>-Select action: Adjust operation/Shed/Accept penalty for defined period |
| Billing Information<br>-Current billing period projected to date<br>-Past billing periods<br>-Select sub-period for analysis: date/time | Messages<br>-Alarms<br>-System notices<br>-Utility notice<br>-Initiate message |
| Asset Management<br>-Inventory lists<br>-Select: site/asset type<br>Load Asset Record<br>-ID no.<br>-Load profile<br>-Load status information<br>-Alarm record<br>-Maintenance/Repair<br>-Consumption history<br>-Start-up profile<br>Other Asset Record<br>-ID no.<br>-Description<br>-Status information<br>-Maintenance/Repair | |
| Custom reports | |

| Utility Billing Report Functions | Utility Control Options |
|---|---|
| Select Utility Customer<br>-Select by name<br>-Select by location | Control options by location<br>-Shedding options<br>-Notice options |
| Customer current status:<br>Consumption Rates<br>-Overall<br>-Group view<br>-Load view<br>Link to control options | Tariff adjustment options<br>-Shed/penalty<br>-Other contract-based adjustments |
| Historical Customer Record:<br>-Select Overall/group/load<br>-Maximum demand, any integration period<br>-Maximum demand, selected time range<br>-Instantaneous peak demand, any integration period<br>-Instantaneous peak demand, selected time range<br>-Graphing | Generation initiation options<br>By location<br>Automated/Requested |
| Billing/Payment Information<br>-Current billing projected to date<br>-Past billing periods<br>-Payment records | Messaging to customer<br>-Control message<br>-Shed/penalty demand<br>-Audit follow-up for corrective billing or corrective action on metering<br>-General notices |
| Custom Reports<br>-Audits for total revenue protection<br>-Audits for revenue security by billed customer | Messaging from Customer<br>-outage report<br>-distribution equipment exception report |

# SYSTEM AND METHOD FOR RESOURCE MANAGEMENT

CROSS-REFERENCE TO RELATED APPLICATION(S)

This application is a continuation of U.S. Ser. No. 11/860,974, filed Sep. 25, 2007, issued as U.S. Pat. No. 7,873,441 on Jan. 18, 2011, which is based on U.S. Provisional Patent Application Ser. No. 60/826,857 filed Sep. 25, 2006. The priority of both of these prior applications is claimed and they are incorporated by reference.

FIELD OF THE INVENTION

This invention relates to the fields of resource usage measurement and monitoring, mining measurement data to find waste and usage control for devices using electricity or other energy or consumable resources, such as water or gas. More particularly, the invention relates to the use of computers integrated with logic controllers and communications technologies for measuring, monitoring, estimating and managing resource use optimization.

BACKGROUND OF THE INVENTION

Utilities worldwide have for many years been seeking to have control of the energy consumption of their customers and adjust the consumption to match the utilities' generation and supply capacity. Measures have been suggested and introduced by utilities to achieve the above but, to date, the measures taken have not satisfactorily solved the problem. Consumers and commercial users have also been seeking a way to minimize wasted energy (or gas and water), reduce their monthly costs, take advantage of utility rates that vary during the day or week and otherwise maximize efficiency and device usage while accomplishing their business or household objectives. For both utilities and users, minimal success has been achieved, but a satisfactory comprehensive solution has not been found for discovery of resource waste and enabling utilities and users to make informed decisions about managing energy waste. Many company officers, when questioned about how and where energy is wasted, simply have no answer and thus no ability to improvement energy management.

A system that would give the resource user (buyer) a means to automatically, without undue impact on business or household objectives, control energy or other resource usage, eliminate waste and realize savings in monthly bills would be desirable. Such a system would also be desirable because it would provide one or more benefits: less energy or other resources wasted, less pollution for the environment, and, for electrical energy, fewer new transmission lines and new power stations, fewer blackouts, lower spinning reserves and/or other production and distribution advantages. Further, for large commercial users, who may negotiate rates and usage levels with provider utilities, having the ability to reduce and control resource usage places the user in a more favorable bargaining position. In addition, a system that would give a user more information about resource usage may permit the user to understand better the way resource use is related to achieving user business or household objectives. This better understanding may assist the commercial user in identifying waste, planning coordinated use of loads and achieving more efficient use of loads and related labor in business processes.

Current systems for resource use measurement and control are generally piecemeal. They provide too little information, too slowly and/or lack adequate intelligence for automatic control and require the user to close control loops. They also lack suitable control options. Simply turning off equipment will save energy, but this is not consistent with business process requirements. Resources must be saved, where possible, with minimum adverse effects on the business process (or consumer) goals.

BRIEF SUMMARY OF THE INVENTION

Among the benefits of the system described are monitoring consumer systems for electricity, water and gas use data that can be mined to discover wasted energy and automatically devising means to avoid this wasted energy and at the same time improve the efficiency and quality of the resource use, reduce costs, and prevent some of the common types of blackouts, The system also keeps the resource consumer and the utility better informed. The system further provides means for both the resource consumer and the utility to co-operate and control the resource for the benefit of both, as well as to benefit the environment and national resource policy. Because the system offers effective use controls, a utility may reduce wasteful energy reserves, distribute energy more effectively, improve the stability of the distribution system and eliminate the immediate need for further generation capacity or supply, by making good use of otherwise wasted energy mined out of the user sites. The system may also have other benefits and capabilities, such as better financial planning, energy trading, problem identification and prevention, fault detection, outage detection and management, demand side management (DSM), tariff change notification, and others mentioned below.

BRIEF DESCRIPTION OF THE DRAWINGS

FIG. 2 is a schematic block diagram of a control center of a system for energy management.

FIG. 3a is a schematic block diagram of a customer site with a remote management server (RMS) and multiple remote management controller (RMC) components for a system for energy management.

FIG. 3b is a simplified sample of a load use profile report for the loads of FIG. 3a.

FIG. 4 is a schematic component diagram of a remote management controller (RMC) component of a system for energy management.

FIG. 5 is a schematic component diagram of a remote management server (RMS) component of a system for energy management.

FIG. 6a is a simplified example of a load operating plan.

FIG. 6b is an example power factor control goal for use in an energy management system.

FIG. 7 is a flowchart showing high level system configuration and operation steps for an energy management system.

FIG. 8 shows a pair of resource use rate vs. time graphs illustrating an example of a displacement strategy for an operating plan in an energy management system.

FIG. 9 is an example of a graph showing for a 24-hour period an historical resource usage pattern, a resource control goal set and an optimized resource usage pattern resulting from use of an energy management system.

FIG. 11 is a tabular representation of parameters used in a load level intelligent controller (RMC).

FIG. 12 is a tabular representation of parameters used in a group level controller (RMS).

FIG. 13 is a schematic diagram showing the transfer of an available amount of resource use from one load to another.

FIG. 14 is a high level flowchart for a method of billing a user of the present system based on savings relative to an historical benchmark.

FIG. 15 is a diagram of fields and functions for a resource user display/decision/control screen provided by the present system.

FIG. 16 is a diagram of fields and functions for a utility display/decision/control screen provided by the present system.

DETAILED DESCRIPTION OF THE INVENTION

Figure 1:
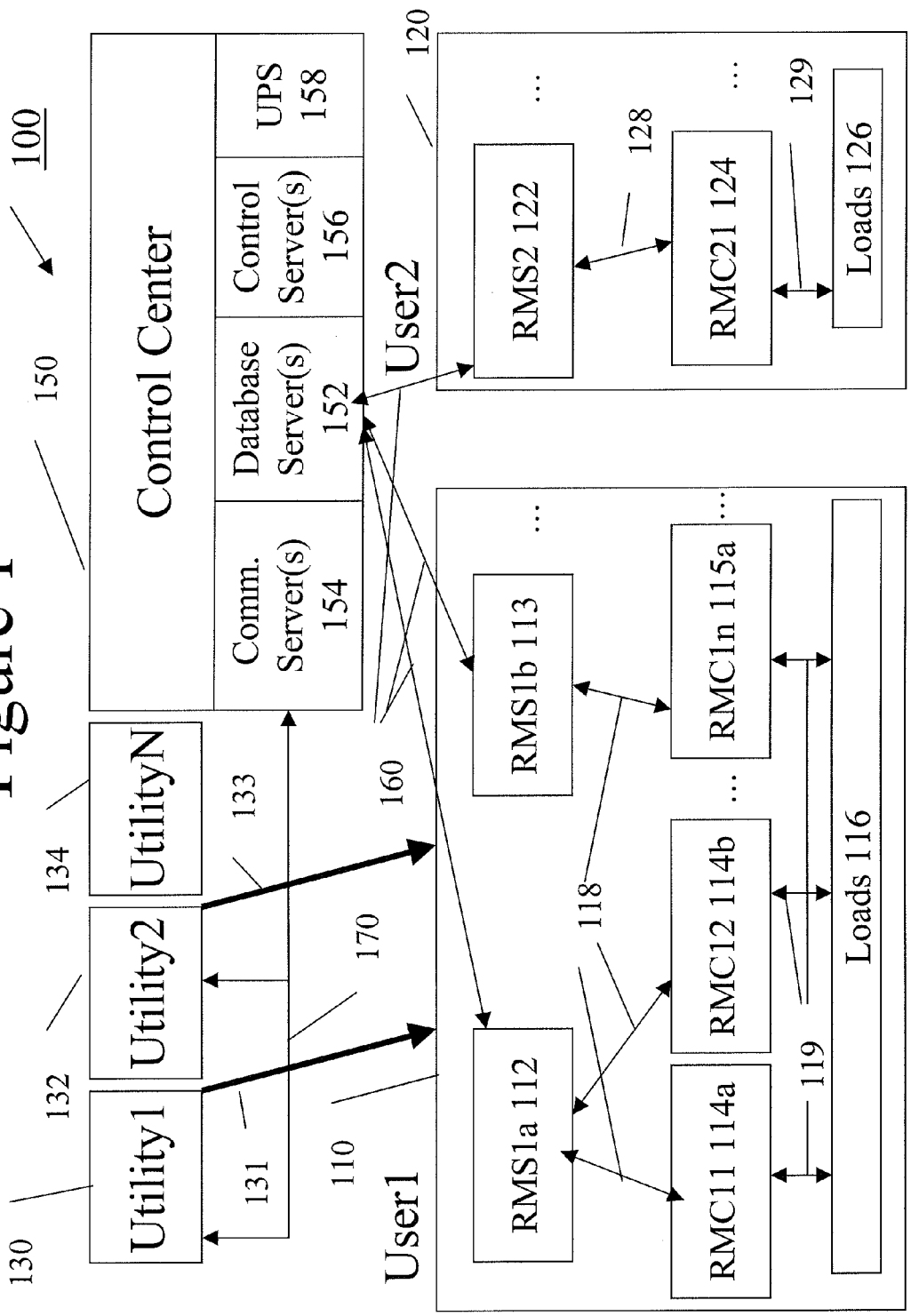
FIG. 1 is a schematic block diagram of a system for energy management.

Introduction. The present energy management system assists customers of utilities that purchase a resource such as electrical energy, gas or water to control and make more efficient their use of such resources. The fundamental form of resource use control exercised is to reduce the consumption rate of one or more resource-consuming loads at specified times by changing the operation of the load, including moving its start time, adjusting it to a lower consumption or operating rate or removing it entirely from operation (shedding), either for an extended period or for intermittent intervals. However, all users have some objectives they expect to achieve by using their resource-consuming loads. For business users, these objectives may include production tasks directly associated with revenue, such as producing X units of product A by date a/b/c. For other business users, important objectives may be providing an acceptable environment for employees delivering services and for their customers and also for information processing and communication systems that are used in real time and/or for back-office type processing of information essential the business services. For a food wholesaler and retailer, the business objectives include warehouse and retail level food storage at appropriate temperatures and efficient receiving and distribution of food items requiring specific environments. Heating, cooling, lighting and sanitation systems all use resources, and their efficient use is of interest to household consumers and commercial users who manage residential buildings, office buildings or production facilities of various kinds.

The present system addresses the need to make resource use more efficient while permitting a user to pursue business or household objectives by improving both information and control. The present system provides at one or more loads means for measuring resource consumption, means for measuring a variety of status data for a load or its environment that are relevant to its efficient operation, and means for controlling operation of the load in accordance with the user's defined operating objectives. The system implements user operating plans that embody user objectives and uses control goals to monitor and/or limit the pursuit of the defined operating plans. Both the defined operating plans and the control goals may be adjusted. In a system with multiple loads, the granularity of measurement of resource use may be at the level of individual loads or even controllable subsystems of such loads. This produces a wealth of measurement data that can be used for real time control as well as stored and mined to identify waste or patterns that enable better management of complex equipment networks. The measurement and control is largely automated, because the complexity of a multi-load system, with complex and changing operating plans for each load, and the need for coordination between operating plans at various loads and for applying multiple control goals and the presence of many messages make adequate human control difficult, particularly for time-critical decisions. However, the system may also provide the system users and resource suppliers (utilities) information focused on one or more loads or load groups and their particular conditions and control goals, and offer certain control options, permitting human decision-makers to adjust operating plans and/or control goals and take other actions in view of business or household objectives.

Power utilities monitor and control their networks using Supervisory Control And Data Acquisition (SCADA) systems. The SCADA areas of responsibility are traditionally divided into the following areas: Generation, Transmission and Distribution. The term "visibility" is used to express the degree to which the utility is able to monitor the condition of its network. Most power utilities have fair visibility for their Generation and Transmission infrastructure, but very few power utilities have good Distribution visibility. The present system adds one more category, namely Sub Distribution SCADA, which monitors and controls that part of the network which is between the Distribution Substation and the end users premises. Currently, if there is a problem on the Sub Distribution section of the network, power utilities place recorders on the network and monitor for a few weeks before undergoing a lengthy analysis. This process may be repeated several times before identifying a potential solution, if the problem can be identified at all. The solution proposed with the present system allows a cost effective solution that enables the monitoring and controlling of the sub Distribution and Distribution networks, while also providing the power utilities real-time load control, which improves the security and reliability of their networks. The cost of any system to measure and manage a resource must align with the value of the savings achieved. For many situations, system cost must be less than the value of 12 months of energy savings to be viable. The system described herein is a comprehensive and integrated solution to achieve low system costs.

A resource control goal for the system may be defined in various ways. In one embodiment, the control goal is a user-selected budget by amount of the resource or by cost of the resource for a specified time period (such as a day, week or month). (Amount and cost may not be directly equivalent where rates may vary according to the time of usage.) In another embodiment, the resource control goal is defined by criteria related to a maximum instantaneous peak resource usage (e.g., fraction of a second) or other short period (e.g., seconds) or usage for an integration period on the order of five to thirty minutes which may vary by time of day. In a further embodiment for a production facility, there is an underlying operating plan that has some production or output objective, e.g., achieving a production or output level for a defined period, for example, in a process where the resource is used for heating to a high temperature or cooling to a low temperature, or pumping, grinding, compressing, metal plating or other work that consumes the resource and is directly associated with production/output results. Here, the resource control goal and the operating plan may come into conflict and the system has the capability automatically to give priority to one or the other (e.g., adjust the production/output goal downward in order to achieve the resource control goal) or to present the priority choice to a human decision-maker. The decision-maker is provided with information on the options and the impact on the resource control goal and the operating plan.

In a still further embodiment, the control goal is defined primarily by negotiation with a utility that supplies the resource and seeks to plan its capacity needs. The dimensions of such a negotiated control goal may be multiple, including peak usage limits, minimum payments for defined periods (effectively defining a minimum usage level), rates contingent on usage levels and specific times, usage levels that trigger load shedding rights for the utility or that call for the user to transfer to the utility resources from the user's storage or generating capacity. The utility also may negotiate shedding demand rights based solely on its own situation, with the user forced to accept penalties it if resists the demand. These kinds of control goals may present a business with economic choices that need to be verified against business objectives. Users often make incorrect intuitive decisions in these situations. The present system assists in formulating and evaluating such choices in specific economic terms. For many situations, the present system can provide an automated solution in which the measurements are the basis for rational decisions about reducing an entity's resource use without adversely affecting business objectives.

In some embodiments, there are multiple goals that can be pursued concurrently or multiple goals that are pursued concurrently until a conflict is encountered, at which time assigned priorities determine which control goal(s) or business objectives are pursued. Thus, a control goal set with priority rules is defined, and it becomes important to have computer tools to manage monitoring the multiple dimensions of the goal, monitoring external conditions that may affect one of the monitored dimensions and optimizing planned actions or emergency interventions taken that may affect multiple dimensions. Historical usage levels are relevant to setting a control goal, but the system anticipates discovering significant waste. With better information, a user will define operating plans that sufficiently change resource usage levels and time frames of resource usage such that the new, more efficient usage patterns may differ significantly from historical patterns.

FIG. 9 is a graph with three curves showing an example of how a simple (two dimensional) resource control goal set may be defined. The solid line historical use curve 910 represents some measure of historical resource usage (e.g., kilowatt hours of electricity per integration period) over a 24-hour period (indicated in the horizontal axis by military time), which the user wishes to improve. (Each 24-hour period may be divided into consecutive integration periods, e.g., fifteen minutes or any other period the utility may decide. FIG. 9 shows an example of two consecutive integration periods at 940, 941.) The solid line curve 910 also shows vertical spikes (e.g., spikes 912, 914) representing instantaneous peak values that occurred, typically during equipment start-up, when resource use is increasing. Because utilities typically charge major users based on both a maximum instantaneous peak power (over any one integrating period during any billing period) and levels of steady-state consumption, with different rates for peak and non-peak periods, a control goal set that addresses each of these factors can be more effective. The lighter, solid, straight lines 920 in FIG. 9 represent a possible control goal set based on steady-state power use, as measured over some integration period (e.g., fifteen minutes) for four different time ranges: midnight to 0500 hours; 0500 hours to 1600 hours; 1600 hours to 2100 hours; and 2100 hours to midnight. The heavier, solid, straight lines 922 represent a possible instantaneous peak power use control goal set for the same four different time ranges. (It should be noted that several spikes on historical use curve 910 would violate the limit defined by goal line 922.)

After study of its business objectives and current load use pattern, the user will identify waste and may develop operating plans designed to meet business objectives but keep both instantaneous and steady-state usage levels below the limit values defined by the two sets of straight lines in FIG. 9. If a control goal is based on negotiations with a utility, any failure to do so may cause a financial penalty or the risk of some load shedding under the control of the utility. The dotted line curve 930 represents a possible improved usage level (including spikes representing instantaneous peak values) resulting from an operating plan and use of control goals over a 24-hour period, which the user achieves by finding waste and using all or a portion of the system described herein. If the operating plan is well-designed because it removes waste and uses informed predictions of external conditions, knowledge of load characteristics and data on how various load operating levels can affect production or other user goals to keep resource usage below both instantaneous and steady-state limit values embodied in control goals, the user will achieve its objectives and may have the economic benefit of lower monthly bills. The utility may have lower capital costs and less need to contract for expensive additional power resources.

To provide resource use control and optimize production/output defined in user objectives, the system uses programmable controllers at the level of individual loads and also at higher control levels, responsible for managing multiple loads. One function of the controllers at individual loads is to measure instantaneous and steady state levels of resource usage by the load and to communicate to the system all or a portion of the measurements. These measurements provide the foundation for evaluation of current load use to identify waste at specific loads, for designing changes in operating plans and for real-time control events.

The system controllers store or have access to load profile information on the characteristics of each load to be controlled: e.g., start-up usage pattern, steady-state usage patterns; control options based on speed, pressure or other selectable operating parameters; and production or output levels based on usage cases under various possible load operating rates or levels from minimum to maximum. These data are often taken from manufacturer's specifications, but they may also be based on observation of actual usage patterns and measurement of parameters, particularly where unique factors of a user's business determine production or output. The system also monitors load status data that may indicate operating problems (e.g., reduced operating efficiency) or possible actual or impending failures at loads, such as temperature, speed, critical pressures or dimensions or other parameters at the load. These can be used to spot load situations that may affect resource usage and/or simply to monitor the load as an asset that affects production/output and the failure of which may affect an operating plan. Again, the benchmarks for load status may be taken from manufacturer's specifications, but they may also be based on user observation of actual usage patterns in pursuing its operating objectives.

A user's operating objectives—its business plans in the case of a business user—are translated into one of more operating plans to be implemented in a controller for each controlled load. Thus, the system stores one or more operating plans defining the planned load usage pattern occurring at each controlled load at a user site: e.g., the number and time of start-up cycles; what the planned working loads are and when they change during the day; any linkages between one load and another, such as work one load performs or output it produces that is a necessary precursor of later activity at another load, including the time relations between related work processes or devices that are part of a production group. Where loads are flexible in function, there may be multiple operating plans or alternative operating modes within a plan that may be used in different circumstances.

For production facilities, the various loads are typically used together and/or in sequence in a production process (e.g., semiconductor manufacturing, injection molding, electroplating, material forming and machining) or a sub-process of a larger process. Thus, optimization can be taken further when the resource management system has a full description of use or operating plans for loads relative to production processes. This can include data from an enterprise resource planning (ERP) system that tracks and identifies costs of running loads based on energy or other resource inputs and the contributions of loads to various production/output measures (and, ultimately, revenue and returns on investment). Similarly, loads may be part of an environment in which various parameters must be maintained, e.g., a residential building with individual units, common rooms and facility service rooms (e.g., areas occupied by HVAC or water and waste handling equipment) having different comfort requirements, or a food store with large, open areas, where there is a desired air temperature, and refrigerators, freezers and/or heated serving units in a deli, all of which have desired temperature ranges and may be influenced by site ambient conditions, such as outside temperature, or sunshine through large windows or by consumer traffic.

The present system models the performance of all monitored equipment. From this database, it is possible to determine the saving that will be achieved by using one make of equipment vs. another. Given the operating cycle and conditions of operation, this invention will determine the return on investment and time to repay investment so that management might make an informed decision about replacing a less efficient make of equipment with another. Also, this system monitors out of specification operating characteristics, highlighting problems like low air conditioner gas, dry bearing, vibration, noisy ballast, etc.

FIG. 6a shows a portion of simplified example of an operating plan for a load, e.g., L1. The horizontal axis shows a portion of a week, in this case Wednesday through Saturday. The vertical axis shows by horizontal lines a planned operating level for load L1 for all hours of the days Wednesday, Thursday, Friday and part of Saturday. (In a full, actual operating plan, all days of a week, month of other planning period may be covered.) An operating level for the device/load, as shown by lines 610 may be expressed in units of speed, number of items output, percent of maximum work capacity or some other measure of work, or in terms of the expected level of consumption of the resource the load consumes, which with skillful operation should conform to a level of speed or productivity. For each day, the load starts out at one operating level, steps up to a higher level in the middle of the day and then decreases to a lower level for the last hours of a day. As shown in FIG. 6a, the differences in operating levels during the day may reflect start up issues, constraints in the supply of upstream components needed to run and produce at a given level, differences in skill levels or motivation of operating personnel for various shifts or other factors known to planners.

In the example shown, the operating levels are somewhat higher for each corresponding portion of Thursday as compared to Wednesday. Friday's mid-day peak level is higher than either the comparable mid-day periods on Wednesday and Thursday, although Friday's off-peak operating levels are lower than comparable periods of Wednesday. Another difference is that the periods of highest operating level in each day are not all of equal duration. The differences in operating levels from day to day may reflect differences in order levels or in labor allocated or, for Friday, in the need to shut the load down before it assumes a minimum idle-but-not-totally-off operating level for Saturday. Thus, an operating plan may be established based on shifting production objectives and a variety of other factors. It normally assumes the load is in good operating condition, and would have to be changed if that were not the case.

Before a system is placed in operation, the initial control programs are developed, based on the load profile data, operating plans and resource control goals, which may be defined for individual loads and aggregated to cover a load group. Also, communication channels are set up and configured, so that loads can communicate with controllers and controllers with each other. This forms a network of multiple control nodes. Further communication channels may handle communication between the system, particularly the control center 150, and work stations at the user or the utility. In the course of developing the initial control programs, various inputs are identified for controllers, including load status inputs and control messages that may be received by one node in the system from another node. These inputs are part of the control program design, so that both normal operation ranges and local and remote incidents where exceptions and interrupts are encountered can be properly managed. Message protocols for messages between the system and the utilities or the user are also defined, depending on the information and the control services the system provides to these entities. In one embodiment, the message protocols are based on a mesh network configuration so that all node communications channels perform a router function in addition to reporting the RMC status and controlling the RMC features. If a portion of the wireless network is made inoperative, the remaining wireless network will undergo a route discovery and will determine a new route to exchange information with the RMS, i.e., messages seek alternate paths when a network node is unavailable due to damage, excess traffic or other cause. This provides a measure of protection for continued operation if one or more nodes is lost.

The control programs select an operating path based on and responsive to operating plans, control goals and their various inputs. During operation, the system predicts, in part from load and operating profile data and also local load status conditions, the amount of energy required by a load, a load group or an entire site to pursue the defined operating plan and, based on prevailing conditions, may adjust the load operating level to meet control goals, or to optimize the operating plan, consistent with control goals. The system permits resource use levels to be measured and compared to control goals defined by either (or both) of an essentially instantaneous rate measurement or a rate measurement over a defined integrating interval, such as five, fifteen, thirty or sixty minutes. Comparisons of current resource use to control goals may occur at the level of an individual load and at various sets or groups of loads, including particular load groups used together in a production process or in portions of buildings. The system is configurable to group any set of loads for which an aggregate measure and control goal may be desired. The system sums the load controllers' resource use measurements at various points in time and for short and long measurement (integration) intervals. In response to the comparison, the system may need to reduce resource consumption at a particular load or an aggregate load of a group, or it may discover available capacity to add a load, by one or more strategies to be discussed below. With proper configuration, the system uses at least one control program with an associated operating plan and a control goal to schedule and adjust the use of energy (or another supplied resource) in order to obtain maximum efficiency for the user without loss of production/output or other business (or household) goal relative to the operating plan.

As noted, the system permits the control programs to accept inputs and vary their control behavior based on changing conditions monitored in the load or external to it. That is, a control goal or operating plan may be the subject of ongoing adjustment. The system uses computerized controls that permit rates of resource usage and status of individual loads to be tracked and controlled and may optimizes the resource consumption of a user in accordance with predetermined but variable programmed operating plan algorithms. These algorithms may be continuously and automatically adjusted on line to achieve optimal consumption relative to the user's operating objectives, at the same time taking into consideration the utility's safe operating conditions, as embodied in control goals. Likewise, in some instances, a control goal may be adjusted or overridden, in one or more dimensions and for one or more time periods.

The system provides an automated, utility-independent, predictive, adaptive system to manage electrical energy, water, gas and other similar consumable resources that can be metered out. The system combines several technologies, including measurement techniques, wireless and/or power line communications, monitoring and control of equipment, and use of predictive calculations and programmable logic. These permit measurement of resource use and load status data of one of more individual loads, enabling the system to exercise control effectively at each of the controlled loads. Each load may have communication capabilities and thus may be part of a network of control nodes. By networking together multiple control nodes, the system can control a single load, multiple loads at one user site, multiple loads at multiple sites controlled by one user or multiple loads at multiple sites controlled by multiple users. Where multiple sites are involved and rapid telecommunications are available, there is essentially no limit on the geographical extent of the loads that may be under coordinated control.

Among the possible benefits at a site implementing the controllers of the present system are: (a) to identify and reduce waste, thus improving the efficiency of the utilization of electrical energy, water or gas, and saving resources (or other) and costs and eventually contributing to saving the environment; and (b) when used in co-operation with the utilities, to reduce maximum demand and spinning reserves while at the same time avoiding rolling blackouts and improving the utility's efficiency, with users benefiting from incentives offered by the utilities to achieve the above. The system can provide on-line information and/or real-time messages for both the utility and the users so that informed decisions about load operation and corresponding resource use can be made for the benefit of either or both.

The system may also assist electrical utilities in emergency situations by starting up additional standby generators owned or controlled by the users for contribution of energy to the utility grid or for local use (for user loads) and shutting down these generators immediately when the situation has stabilized. The system helps manage and control consumer-generated energy so as to assist the utilities at peak periods and at the same time maximize the benefits to the user and provide the best returns on utility investments. The system may also provide a utility access to a user's stored reserves of resources that are storable, if the user and utility so agree.

The system as described in greater detail below may be used to manage electrical energy usage but may also be used in a similar way to manage water and gas consumption, detecting leaks and wastage at the same time.

Component Overview. An overview of the components of system 100 is shown in FIG. 1. As seen in FIG. 1, there may be one or more user sites, e.g., a home, commercial office or residential building or production facility, shown as User1 110, User2 120. For User1 110, the site may include one or more loads 116. Each of the loads 116 is connected to one or more remote, intelligent resource management controllers (RMC), e.g., RMC11 114$a$, RMC12 114$b$, RMC1$n$ 115$a$. Each RMC has: a) a resource measurement unit (RMU) (functionally similar to a revenue meter, such as an energy meter but with additional measurement features); b) digital processor with software configured as a monitor and control unit (functionally similar to a programmable logic controller); and c) a communications unit, either wireless or power line communications (functionally similar to a modem). (See also FIG. 3$a$.) The communications unit provides communication channels 119 between the RMC's 114$a$, 114$b$, 115$a$ and the loads 116 and also communication channels 118 between RMC's 114$a$, 114$b$, 115$a$ and remote resource management servers (RMS) RMS1$a$ 112 and RMS1$b$ 113 of User1 site 110. FIG. 1 also shows that User2 site 120 has its own RMS2 122 and at least one RMC, e.g., RMC21 124. RMC21 124 may have one or more loads 126 and communication channels 128 to RMS2 and communication channels 129 to loads 126.

Each RMS 112, 113, 122 is connected by a communication channel 160 to a higher level control node at control center 150. Control Center 150 has at least one control server 156, one or more database servers 152, one or more communication servers 154 (for channels 160) and an uninterruptible power system (UPS) 158. In one embodiment, the control center 150 also has a communication channel 170 to one or more of utilities 130, 132. Among other functions described in greater detail below, control server 150 provides optimization decisions based on choices between/among loads under control of RMS1$a$ 112, RMS 1$b$ 113 and RMS2 122, and also between User1 and User2. Because the functions at the sites of User1 and User2 are generally the same, discussion continues with reference to User1 site 110.

As seen in FIG. 1, the resource to be controlled is supplied to User1 110 by one or more utilities 130, 132. For example, Utility1 130 may supply electricity over power lines 131, while Utility2 may supply gas or water over pipes 133 to User1 110. User2 may also be supplied resources by Utility1 130 and Utility2 132, but for simplicity these supply lines are not shown in FIG. 1. In the following, the description will either be generally applicable for any resource or, for some specifics, will focus on control of electrical energy consumption.

RMS1$a$ 112 communicating with RMC's 114$a$, 114$b$ and RMS1$b$ 113 communicating with RMC 115$a$ monitor, measure, predict and control the resource requirements of the associated controlled loads 116, based on control programs that include adjustable operating plans and control goals. The system has software at RMS1 112 and/or at RMC's 114$a$, 114$b$, 115$a$ to measure usage levels and adapt load operating levels based on the load operating plans and stored control goals (see FIG. 3$a$) and on load status and other conditions sensed and received as inputs by the system. The control programs schedule and control load use (add/adjust/shed) to achieve the user's operating goals underlying the operating plans while avoiding as far as possible instantaneous load peaks and steady state load levels that may violate control goals. For example, the operating plan as initially defined or as adapted in response to real time inputs may schedule use of less time-sensitive loads to increase the load consumption at low demand periods.

Because independent operation of the RMC's 114a, 114b, 115a that it controls is desirable in some failure modes, RMS1a 112 or RMS1b 113 may download an appropriate control program to each individual RMC 114a, 114b, 115a, which program is executed by the microprocessor or other data processor present at the particular RMC. Control determinations may occur at either or both of an RMC or at an RMS, with an RMS's position at a higher node in the network giving it information to coordinate optimization and control among multiple RMC's. Different levels in the system have different (but coordinated) operating plans and control goal sets. Thus, each RMC and each RMS functions as a control node in a network of control nodes, with the RMC being the proximate source of control commands to its associated load.

Each of RMC's 114a, 114b, 115a monitors and controls at least one individual load within the User1 site 110, based on its initial control program and any additions and/or modifications to that control program made by the RMS1a 112 and RMS1b 113. Each RMC 114a, 114b, 115a measures the active, reactive and apparent energy used as well as power factor, frequency, voltage per phase, current per phase and starting characteristics for each of the loads 116 connected to it and communicates this information to its controlling RMS 112, 113. As noted, part of each control program is an operating plan, designed to provide a planned production/output (or contribution thereto), and a control goal set, which may limit or change the operating plan, if certain control goals are threatened as the operating plan proceeds. RMS1a 112 and RMS1b 113 also measure (and/or compute from data from the RMCs) the energy used by the loads under their control to verify that the load taken (i.e., resource consumption) is within the specified limits per the control goal and per the load profile information of the load being monitored. This verification may also be done at an RMC 114a, 114,b, 115a for an individual load it controls.

Each of the RMC's 114a, 114b, 115a may also measure the actual starting (switch on) characteristics of the associated load 116 connected to it and convey this information to RMS1a 112 or RMS1b 113, as applicable. Either RMC's 114a, 114b, 115a or RMS1a 112 or RMS1b 113, as applicable, may verify that the starting characteristics are within the manufacturer's specification or consistent with historical patterns, either or both as stored in the load profile information. Any deviation outside the normal characteristics per the load profile information could mean a load problem or the load efficiency is not optimum.

Multiple Levels of Control. One aspect of the system as depicted in FIG. 1 is that there are two or more levels of control, with different control options and decisions available at each level. The lowest level of control is provided by an RMC, e.g., RMC's 114a, 114b, 115a functioning as a load level controller. In one embodiment, each load 116 has its own associated RMC, but a single RMC might also provide control for more than one load, particularly if there were some reason to provide some common control features for more than one load, such as the multiple loads being similar or used together or in a well-defined sequence. As a load level controller, the RMC senses and measures certain local parameters, including: the power or other resource input to the device; operating status parameters of the device itself, such as speed, pressure, temperature, vibration, number of certain repetitive operations, acceleration, on/off duty cycle and efficiency; and ambient conditions at or relevant to the device, including ambient temperature and humidity, status of equipment providing inputs to the device. These measured load status values can then be used to check for defects, where the measurement reflects conditions defined by load profile data, or may also be used for predictive analysis of future load conditions. The RMC has a load level operating plan in it that provides an operating sequence for its load for a day and/or a week or other extended operating period. The RMC load level control program has the ability to accept inputs from the RMC sensors or messages from the RMS, which may provide processed values based on data sensed in raw form at the RMC and passed to the RMS. The RMC control program also may receive control messages generated by the RMS or nodes that communicate with the RMS, which may influence or override the load level control program.

The load level controller/RMC performs certain control functions under control of the load level control program and its inputs. These include turning the load on or off (shedding or adding it), and adjusting any adjustable operating parameters as may be provided in an operating plan (e.g., speed, pressure, low/high working modes) that affect resource use at the load. The RMC may also apply power factor correction at the level of the load. Thus, the RMC issues control signals as needed to the load and to power factor correction equipment for the load. In one embodiment, a complete load level control program is stored at the RMC control node, so that it can operate a load device even when the RMC is not able to communicate to its RMS or any other part of the system, e.g., due to communication disruption. In another embodiment, all or part of the load level control program is stored away from the RMS and accessed by the RMS over a network or other communication channel.

The second level of control is at an RMS. Typically, an RMS control node will supervise one or more loads and work with one or more RMC's associated with each of the one or more loads. The loads an RMS controls may comprise a group of loads combined for operational reasons, geographical reasons (such as all loads at one site) or other administrative reasons. Thus, an RMS functions as a group level controller, providing control over a defined group of RMC's and their corresponding loads. The RMS has its own control program and provides a higher level of control than an RMC, because it is tasked with executing an operating plan and monitoring/controlling to a control goal set that encompasses all (or at least multiple) loads in its control group. Thus, it may provide messages to influence an RMC in its control group, it may provide control messages to override an RMC control program operating in its RMC control group and it may replace or modify an RMC control program operating in its RMC control group. Further, when an RMS controls two or more RMC's, the RMS may make control determinations based on trading off operation of any load, responsive to the group-level operating plan and the site-level conditions affecting any load controlled by one of the RMC's in the RMS's control group.

An RMS may have associated sensors for measuring various parameters to which it may respond, including: the power input to its control group; and ambient conditions at or relevant to its RMC control group, including ambient internal or external temperature, status of RMC's providing inputs to the RMS node, traffic in a building, or other measures that are relevant to management of a control group under its operating plan, such as high or low demand at one or more of the RMC's. It may also receive forecast information for various external conditions, such as weather or consumer traffic.

As noted, an RMS typically stores and downloads the control programs for the RMC's in its control group. An RMS also has the processing power and data storage capacity to provide continuous optimization of control programs for the RMC's in its control group. In particular, an RMS has storage for storing historical usage records for loads, load profile data and one or more adaptive optimizer programs. The optimizer programs can be of any known type, using optimizing algorithms to perform back-testing on stored historical usage data or real time testing of various control program strategies based on load profile data and proposed operating plans, or using neural networks or evolutionary algorithms to provide control program optimization. This may include an analysis that identifies waste due to inefficient operating plans, poor execution of plans due to employees, equipment defects or maladjustments, and other factors. Such optimizer programs may be applied continuously or at intervals (e.g., daily, weekly, monthly), to provide updating of control programs as better information is accumulated or as new conditions or control goals dictate a need to re-evaluate previous optimum calculations. The result can be revised operating plans or revised control goals for any control node in the group.

A third level of control is provided at the control center 150. A control center 150 may coordinate the action of one or more RMS's. In one embodiment, the control center 150 has no direct measurement of power (or other resources) flowing into the RMS's it controls. In these circumstances, power measurements from each of the RMS's in its RMS control group and, if desired, from each of the RMC's under the RMS control group may be communicated to the control center 150, so that it can compute information on the power used in its RMS control group. In another embodiment, the control center 150 obtains an independent reading of the power used in its RMS control group. The control center 150 is positioned to have information on all controlled loads and also on all inflowing power. Further, the control center is equipped with a map of power lines and power flows, Thus, it may use its map of power flows to perform an energy audit of one or more user sites or groups of control nodes. With a sufficient map of power flows and sufficient information, the audit may reveal loss of power, loads that need to be brought under control, problems loads that need service or replacement, and other information that can be derived from detailed knowledge of load power use. Because the use of power is largely additive in a tree-shaped distribution system, the audit may include computations to fill in blanks where a particular control node has not reported data or reported inaccurately. Thus the system can continue to provide useful audit data even when not all control nodes are operational.

Thus, a control center 150 may function as a multi-user level controller, providing monitoring and control over a defined group of RMS's at multiple users with their corresponding RMC's and their associated loads. The control center 150 has its own control program and provides a higher level of control than any RMS, because it is tasked with controlling to a control goal that encompasses the RMS's, RMC's and corresponding loads in its multi-user control group. Thus, it may provide control messages to influence an RMS in its control group, it may provide control messages to override an RMS control program in its RMS control group and it may replace or modify an RMS control program in its RMS control group. Further, when a control center 150 controls two or more RMS's, the control center 150 can make control determinations based on trading off operation of any load, based on the multi-user level strategic value and the conditions affecting any user of the loads controlled by one of the RMS's in the multi-user control group. Because a control center 150 may have more processing power and data storage capacity than an RMS, optimizer programs as discussed above for an RMS may also run at the control center 150. It then communicates revised operating plans or control goals to any control node implicated in its optimization analysis.

To the extent a control center 150 has a communication channel 170 to a utility, the channel 170 may send and receive information to/from the Utility1 130, Utility2 132 to UtilityN 134 (see FIG. 1). As discussed below, that may include data messages and also control messages, within the range of options offered to the utility by a utility interface to the present system.

RMC and RMS. Reference is now made also to FIG. 3a, which shows in greater detail the User1 site 110 of FIG. 1. In FIG. 3a, Utility 1 130 is shown as supplying electrical power over a three phase line 331 to power factor controller 380, associated with RMS1 112. Although as seen in FIG. 1, a site may have multiple RMS's, for simplicity in FIG. 3a, only one (RMS1 112) appears. RMS1 112 is shown as having several associated components, including workstations 310 that allow operators to view and monitor various information flowing into or through RMS1, to input data or new software stored in various databases, to configure the software and other components of RMS1 and to perform remote configuration of RMC's 114a, 114b, 114n. In addition, to the extent an RMS1 addresses a situation by seeking operator intervention, the workstations 310 (or for remote access, communications module 320) provide the display (or display data) describing the situation requiring intervention, the data relevant to operator judgment and the menus of control options available to an operator. (There could be more than three RMC control nodes, and in a site of any complexity there would be dozens or hundreds of loads, each with an RMC; but again, for simplicity, only three are shown.)

The power measurements made at RMCs and RMSs permit the energy audit discussed above to be performed. In addition, if the periodic energy measurements are recorded for particular control nodes, this can yield an energy use profile with a granularity that is at least as precise as the integrating period involved. Such an energy use profile can be depicted much like the curves 910 or 930 as seen in FIG. 9. FIG. 3b shows a further simplified example of curves resulting from load use measurements over time, in this case measurements for loads L1, L2 and Ln for a period Monday through Wednesday. Each day shows a pattern of rising in the first part of the day and declining in the later part of the day. The measurements underlying the graph can be subject to data mining. Areas of interest for data mining might be shift changes or times when the operating crew meets to determine its goals and get instructions on a day's operating plan. If curves are for closely related equipment used in a production line, they may show significant congruence, as in FIG. 3b, or a pattern showing some sequential interdependence. When such load use profile curves show actual use of energy at a load and similar curves are available for other related loads, a great deal may be revealed about the condition of the loads, the skill or motivation of operators, and the coordination of use of loads that are part of a larger process or objective. This information not only lets the user review and improve (or lets data mining programs the user configures based on its business objectives analyze) its operating plans and also to look for training, workflow revisions or other factors beyond load operating levels that may reduce waste and allow improvement of operating plans.

Referring again to FIG. 3a, communication module 320 manages communication channels 160 to the control center 150 and to User1's enterprise resource planning (ERP) program 380 and also channels 118 to the RMC's 114a, 114b, 114n, as well as any internet or RF communications desired. Given the importance and sensitivity of the messages these channels carry, the messages may be encrypted or otherwise made secure. Data stored in memory associated with RMS1 112 include rate rules 330 (documenting the cost of resources per the utility rates and billing rules), load profile information 332 and control programs 350. Sensors 340 provide sensing of various site level information, and measure incoming electrical power, including active, reactive and apparent power components.

The control programs 350 are of two different kinds. One type of control program is the load level control programs that are typically used at RMC's to provide control of specific loads based on load level plans and control goals. A load level control program (with associated operating plan plus control goal set) provides control based primarily on the local load status and the way that load fits into a predetermined role for that load in production/output plans and control objectives defined at some higher level. Because an RMS typically controls multiple RMC's and their loads as a group with group level control goals, an RMS also has a group level control program which is based on the higher level plans and objectives of the group of loads. This group level control program may provide control messages to one or more RMC's containing information that needs to be processed at the RMC by the load level control program or provide control commands that effectively pre-empt and override the load level control program, based on a group level control goal. That goal may not be within the operating range of the load level control program either because of its limitations or because the RMS has certain information available to it that is not available or processable at the load level control program. The load level control programs and group level control programs 350 are stored to be accessible at RMS1, although load level control programs are typically downloaded to RMC's 114a, 114b, 114n for execution there.

Any of the load level or group level control programs at RMS1 may be monitored by the RMS's Adaptive optimizer 360. Adaptive optimizer 360 is configured to analyze and test the performance of the load level or group level control programs relative to one or more control objectives or optimization standards or to subject the control program to continuous directed optimization exploration. These approaches can lead to algorithm changes that have been verified under one or more criteria as optimized relative to existing operating plans or control goals. Adaptive optimizer 360 may report to operators at workstations 310 the discovery and verification of optimization opportunities. The operators may then direct reconfiguration with the optimized software. Alternatively, adaptive optimizer 360 may be given sufficient supervisory control that once it has verified an optimization opportunity, it may effect the optimization by adjusting parameters of a load level control program or completely replacing load level control programs, including RMC operating plans or control goals. Similarly, adaptive optimizer may effect the optimization by adjusting parameters of a RMS1's group level operating plan or control goal or completely replacing these.

As further seen in FIG. 3a, if the user has user generation capacity 370, this may also be part of the subsystem controlled by RMS1. In that case, RMS1 determines whether it has received a message directing it to employ user generation capacity 370 to provide energy locally or to a utility (which may be empowered to determine its activation), i.e., the power generated is fed on line 372 back to Utility1 130. In some instances, the control program of RMS1 may make its own determination, consistent with arrangements previously agreed with Utility1, to generate and provide power to Utility1.

As also seen in FIG. 3a, each RMC 114a, 114b, 114n has one or more associated loads. By way of example, RMC11 has associated load L11 116a. RMC11 also has an associated RMU 214 and other sensors or ports for receiving sensor signals. RMC11 also has a processor and memory 216 for executing its control programs. Also shown in FIG. 3a are RMC12 114b with load L12 116b and the possibility of adding further RMC's, e.g., RMC1n 114n with load L1n. (RMC12 and RMC1n have the same features as RMC11, but for simplicity these are not shown in FIG. 3a.) Each RMC 114a, 114b, 114n by itself, or in association with RMS1 112, has the facility by control commands to switch on or off (i.e., connect/disconnect) or adjust the operating level of its related load (provided the load is adjustable). The switching may involve interlock with other loads or equipment in a predetermined logical manner. For example, in certain processes it may be necessary to have some equipment started before others or shutdown of two loads may need to be coordinated, because of a dependent relationship. Further, in some systems, instantaneous peak load may be managed by separating and sequencing of load start-ups. These interdependencies are stored in the control programs 350 of RMS1 112 and/or at RMC11 (see 314a) for execution by its memory and processor, or may be transmitted to other suitable nodes of the network comprising the system and made accessible via the network to the RMS and RMC components that need them to exercise load level or group level control.

RMS1 112 and/or each RMC 114a, 114b, 114n measures and controls energy use based primarily on an operating plan that is intended to achieve a user's objectives and resource control goals. As noted, this resource control goal may be established by a user itself or in a negotiation with a utility and may be a control goal set with multiple dimensions. For example, FIG. 9 shows a possible steady state control limit 920 and an instantaneous peak value limit 922 for each of four time periods, which may be used as a resource control goal set. The resource control goal files for RMS1 and rate rules 330 are stored to be accessible to its group level control program. In some situations the resource control goals are also stored with Control Servers 156 at the level of a control center 150, where the resource control goals for multiple RMS's may be stored. Control center 150 stores as well higher level resource control goals that may be defined for a control center 150, when it is empowered to coordinate the usage of power for multiple RMS's for one user or multiple RMS's for multiple users. Thus, the control center 150 may use a control center level control program and control center level control goals to look for opportunities to use a lowered resource usage level achieved at one RMS to accommodate a higher resource usage level at another RMS, if a operating plan defines that as desirable.

In the case where the RMS control nodes that the control center 150 oversees belong to the same user, the control center 150 may find opportunities to increase production, comfort or other user site value reflected in an operating plan when it looks for a usage level that is below a user control goal and decides to come closer to the use goal, to increase production, comfort etc. The control center 150 may equally well conclude that it is undesirable for the user to pursue further any production, comfort or other user site objective, which will normally involve some increase in expense for the corresponding increased resource use. When underutilization is found, and the control center 150 is properly empowered by the resource users that it monitors, the control center 150 may have an opportunity to transfer one user's underutilization gap to another user. That is, the control center 150 may act as a broker for instantaneous transfer of capacity among a coordinated set of users, who have agreed to sell available differentials between their scheduled usage levels and their resource control goals to other users who may desire to exceed their then-current resource control goals. If this function is performed at the control center 150, market rules are stored in memory, with a market module 270 (See FIG. 2) stored and executing at the control center 150 to perform automated buy-sell transactions or offer these at user interfaces, where time permits.

Each RMC 114a, 114b, 114n may have in its load level control program a flexible operating plan to use and adjust loads in a predictive predetermined manner, so as to reduce loads at maximum demand periods but maintain efficiency and productivity. The predictions may be based on environmental considerations measured at the load, if the loads controlled are HVAC, or may be based on production plans driven by input from an ERP system 380 to RMS1 112 and converted into operating plans or control messages issued by RMS1 112 to the RMC's it controls. If the loads are production equipment that may have various usage and output capacity levels, the inputs from the ERP system 380 permit the ERP's value to be extended to include efficient use of energy and other resources.

The system also permits efficiency in power factor control. This can be important when an electrical utility penalizes low power factor by charging more for power during periods when a low power factor is measured, e.g., below 0.96 power factor. Each RMC 114a, 114b, 114n not only measures at its RMU the active power taken by its corresponding load but also the reactive and apparent energy as well as the power factor. The RMC's control program may include a component to evaluate power factor and to provide control signals to capacitor banks or other power factor correction equipment (see FIG. 1), PFC) so as to achieve a near unity power factor at the particular load controlled by an RMC. An RMC's control program may also communicate power factor values to the RMS1 112, which can use these and power factor measurements made at the level of the power flowing in the lines 331 that feed the group of loads controlled by RMS1 112. As seen in FIG. 3a, RMS1 112 may have a control program with a component to measure and evaluate power factor and to provide control messages to the power factor controller equipment 380, associated with the lines for the group of loads. This permits the load group to achieve a near unity power factor, which results in the reactive energy being reduced to almost zero for the group of loads. This saves wasted energy in internal circulating currents. Where RMS1 112 controls all loads from a user, it may be able to keep the power factor for the user above a predetermined level where a utility imposes a penalty.

As noted and shown in FIG. 6b, one dimension of a resource control goal can be defined by each of the different energy measurements relevant to power factor. For example, in FIG. 6b, the first three time intervals are shown as achieving essentially unity power factor (near zero reactive power) at different levels of power consumption. The final time period shows a deviation from unity power factor, perhaps because this goal is simply not achievable with the mix of loads that are operating at this time period, notwithstanding system intervention with correction equipment.

The RMS1 112 also provides an opportunity for a resource use audit. The control program of RMS1 112 may be configured to compute totals from all the energy measurements reported from all the RMU's 114a, 114b, 114n directly controlling loads and compare these measurements with the total measured input of power from the utility to the load group controlled under RMS1 112, to ensure that no energy at the user site 110 is unaccounted for and to ensure that the accuracy of the integrated system is within the specified limits.

In one embodiment, the RMU's used in the system are instrumentation that has been certified for accuracy in one or more dimensions of resource use measurement. The benefit of such certification is not only greater accuracy of data collected by the system but also greater authority for the data collected. For example, in the electric power industry, various factors can make it difficult for an electrical power utility to get an accurate reading of power consumption for a particular user site. (Such factors can include faulty meters or meter hookups, or can also include customer tampering with meters and metering hookups.) The present system can meter power at multiple points and measurements can be cross-checked. In addition, if the metering equipment is calibrated and certified as accurate, it can become the authoritative source for consumption measurement. In particular, a user who has measurements of power consumption made by certified equipment and has access to the utility billing rules and tariffs has a basis for disputing billing statements that do not appear accurate. Accordingly, installation of accurate, certified calibrated RMU's permits the service provider to develop data for auditing the billing by a utility, an action not normally within the possibilities of a user. For example, using the measurements developed at its own loads and load groups a user or a service provider acting for a user can do a direct comparison of its audit data on KWH usage factors, time of usage factors, any relevant instantaneous peak values, or other data used in a utility's billings to apply the applicable billing rules and thereby discover any billing discrepancies it may wish to question.

For energy accounting, energy usage by individual loads must equal the total energy purchased from the power utility. It is not cost effective to place energy measurement devices on every load, because the 80/20 rule generally applies, where 20% of the loads use about 80% of the energy and the remaining 80% of the equipment only use 20% of the energy. Therefore, using algorithms like load flow, etc, the energy consumed by smaller equipment is estimated so that energy balance may be determined.

The more accurately measured usage data may also be used to aid utilities. A resource utility (electricity, gas, water, etc.) is usually government regulated and its revenue and profitability watched closely. Ideally, its revenue will correspond exactly or closely with the resources it distributes. If it fails to fully and accurately bill for the resources it distributes, the cost for the customers that pay is higher than it should be. Its profitability is not properly presented. Again, the causes of inaccuracy, particularly a failure to bill for all units of the resource it distributes, include faulty meters, meter multipliers or meter hookups, or can also include customer tampering. The data measured by the present system can also be used for a utility-side audit.

Figure 17:
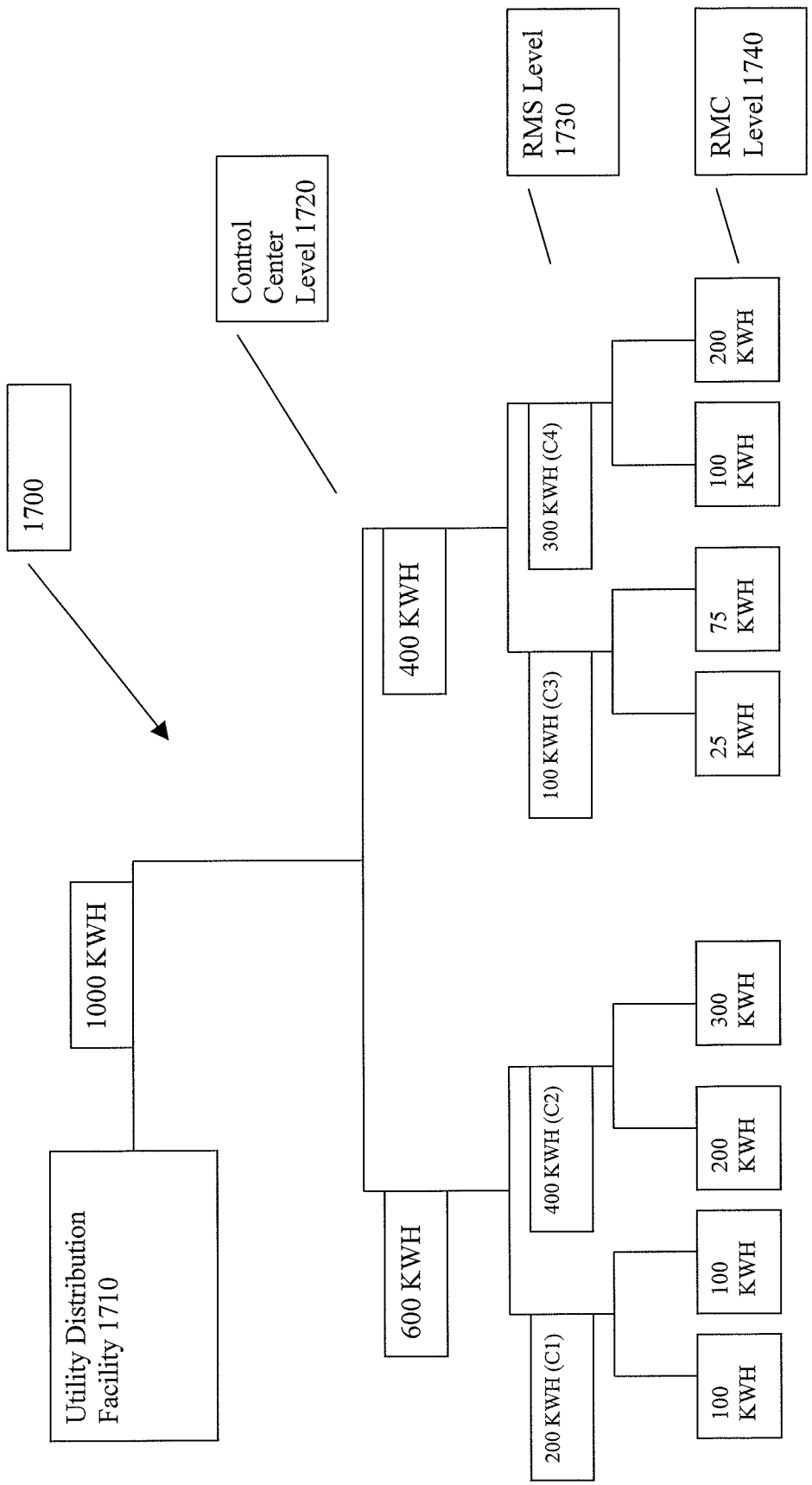
FIG. 17 is a simplified diagram of loads and control nodes with KWH resource consumption levels representing sample audit data provided by the present system and usable by the a customer or a utility.

In one embodiment, the present load level controllers, group level controllers and control centers can be placed at multiple loads in a customer group served by a distribution facility to provide a system 1700 for protecting a utility's revenue resulting from its sale of a consumable resource. For example, FIG. 17 shows a simplified diagram of loads (at RMC level 1740) and control nodes (at RMC level 1730 and control center level 1720) with KWH resource consumption levels to represent sample, idealized audit data provided by the present system and usable by a customer or a utility. For example, the eight KWH values at the bottom of FIG. 17 (RMC Level 1740) represent resource consumption at particular loads. The four KWH values at the RMS Level 1730 may represent resource consumption at four customers C1, C2, C3, C4. The KWH data may be directly measured at all nodes or but more cost effectively is measured at sufficient nodes for major resource-using loads to allow calculation or estimation of indirectly measured KWH data for all the nodes of interest. In one form of audit, the nodes of interest are any node for which there is billing history. Here the measured values from the system 1700 can be compared to the utility's measured resource usage value used for billing, or a billing amount computed based on the measured resource usage values from the system 1700 and applicable billing rules can be compared to the utility's billing amount. If there is a discrepancy, the utility can take action by issuing a corrected bill based on the measured values from the system 1700. In addition, the utility can take steps to determine a basis for the discrepancy, which may be in metering (e.g., faulty meters, meter multipliers or meter hookups, or can also include customer tampering) or in billing computation, or both, and initiate corrective action (repair, reprogramming) for its metering and/or its billing computations.

For this audit, the method comprises: measuring at one or more loads or load groups of a customer group the resource consumption in such customer group, such measuring providing resource consumption audit data sufficient to determine the total resource consumption by at least one billed customer; determining from billing records for the defined billing period whether the amount billed to the at least one billed customer for resource consumption corresponds to a calculated full payment for the measured resource consumption provided from a distribution facility; and responsive to a determination that the customer was under-billed relative to the resource consumption audit data for that at least one customer, storing as an audit result this determination and the amount. The stored audit result can be used to initiate corrective action for the utility's metering and/or its billing computations.

Another audit of interest begins with a measured value believed to represent the total resources provided to a customer group from a distribution facility of the resource provider over a defined billing period. That value may be provided by the utility or a service provider that measures sufficient nodes in the utility's distribution grid may compute such a value for the utility. The utility can then compute an expected revenue number based on billing for all of the resource represented by the measured value that represents the total resources provided to a customer group from the distribution facility. If there is less revenue billed than expected, the audit data measured by the service provider at various nodes in a its measurement and control network (i.e., at control center level 1720, RMS level 1730 and RMC level 1740) can be used to find where the resource actually went and whether the utility suffered correctable losses resulting from metering or billing computation errors. Here, the focus is to make corrections having the greatest overall impact on total revenue, as opposed to finding every customer under-billed by even a small amount (although this may be achieved eventually).

For this audit, the method comprises: receiving a measured value representing total resources provided to a customer group from a distribution facility of the resource provider over a defined billing period; computing a total revenue value realizable from the total resources provided to a customer group from the distribution facility and by comparison with billing records, determining if there is a shortfall between billed revenue and the total revenue value realizable; if so, measuring at one or more loads or load groups of the customer group the resource consumption at such customer group, such measuring providing resource consumption audit data sufficient to determine the total resource consumption by least one billed customer; determining from billing records for the defined billing period whether the amount billed to the at least one customer for resource consumption corresponds to a calculated full payment for the measured resource consumption provided from a distribution facility; and responsive to a determination that the customer was under-billed relative to the resource consumption audit data for that at least one customer, storing as an audit result this determination and the amount. The stored audit result can be used to initiate corrective action for the utility's metering and/or its billing computations.

In a typical system as shown in FIG. 3a, the group level control program at RMS1 provides a more complex level of load control and balancing, based on the operating plans and control goal set defined for a group of loads. The RMS1 112 coordinates all the operations to be performed by the various load controllers, comprising RMCs 114a, 114b . . . 114n in the group. As needed, the control program of RMS1 112 processes data relevant to the group of loads and may change an operating plan to defer or reduce operation of a load at maximum demand periods and connect this deferred load (or operate it at a higher operating level where the load has multiple levels) when the energy demand is low (peak shaving and valley filling), so as to reduce overall maximum demand at any integrating period.

FIG. 8 shows schematically a simplified example of peak shaving and valley filling. The solid lines 810 show in simplified form a graph of historical resource usage (e.g., kilowatt hours of electricity per integration period, e.g., interval 802) for a site over a 24-hour period (indicated in the horizontal axis by military time). As can be seen from solid lines 810, the highest historical usage level is in the period T1 to T3. Assuming this is (wholly or partially) the highest rate period, the user will wish to improve efficiency by moving consumption out of this period to the lower rate periods, e.g., those before T1 or after T2 or T3. If analysis of the loads and operating plan show that use of the resource by certain loads can equally well occur outside of the period T1 to T3, the operating plan can be changed so that planned consumption levels (and/or control goals) are as shown by the dotted lines 820. In the middle interval, between T1 and T2, the consumption level expected from the operating plan and shown in dotted lines 820 is lower than the historical level. The graph shows that in the interval T2 to T3, the consumption under the new operating plan rises, although it stays below the historical level (solid lines 810) until T3. As can be seen, although there may be a total reduction in resource use over the 24 hour period from use of the new operating plan, use is actually above the historical levels before T1 and after T3. The exact level of use at each of these times is selected so that by using the resource in a lower rate period the total resource cost computed across all rate periods is less than the historical amount, even if the actual amount of resource consumption might be greater. (In this example, for simplicity we assume in the operating plan that consumption at the loads will remain constant in the intervals shown for the dotted lines, but in reality variability can be expected, as the presence and operating rates of loads may change.).

RMS1 112 may also adaptively adjust the loads controlled by the RMCs so as to obtain as near to maximum efficiency as possible and to meet the applicable resource control goal.

This is achieved by controlling such equipment associated with loads as frequency controlled inverters or by use of pulse width modulation, phase control, and other known power saving and control strategies available with motors, electrical heating elements and other loads. Such functions may also be performed based on the load level control programs at the RMCs 114a, 114b, 114n for loads that each controls.

RMS1 112 also communicates status and control information via the communication channel 160, which may be in the form of a local private area network (PAN), the Internet or an Intranet, to Control Center 150, where this information is stored in a database for easy access and control. Users may be provided information applicable to their use by database access, such as by a browser, or may have the information sent to them in various ways, at intervals, or more or less continuously. Certain information such as total consumption, load per RMC, load profiles per RMC, alarms, utility billing information, management reports and other information may be communicated to each user as required by the RMS over local communication network or other communications link to a user-owned workstation (not shown). In one embodiment, the system provider makes available to a user one or more of workstations 310 to access databases maintained by the system to get such information. The availability of this information to users is important, as it permits them to perform data mining and to redefine, in consultation with the operator of a control center 150 or the operator of an RMS, the operating plans and control goals, as additional interactions between loads are understood and additional opportunities to move load usage away from peak intervals are discovered. The workstation 310 at an RMS permits information for operator decision-making to be displayed. Operator input can be taken via control menus to guide or override the control program in an RMS.

Control Center. As discussed, the Control Center 150 provides a higher level of control, providing supervisory control over RMS's under its control and over the groups of loads control by each RMS. Referring again to FIG. 3a, in case the RMCs 114a, 114b, 114n and/or the RMS 112 encounter any problems not addressed adequately by a group level control program or a load level control program, information processed by these control nodes may be communicated to one or redundant control centers 150 for a higher level control decision. The Control Center 150 functions to optimize efficiency and savings per customer by performing one or more of the following:

1. Communicate with all RMSs
2. Monitor and control all the RMSs
3. Remote program and optimize all the RMSs
4. Schedule processes for each user
5. Store all the information received in database servers
6. Send required information to users
7. Automatically control any user energy generation
8. Provide historical data and graphs to customers
9. Provide billing information to users
10. Provide management reports to users
11. Monitor user equipment for problems indicated by energy usage
12. Communicate with and provide service to users
13. Communicate with and provide service to the Utilities
14. Assist to balance energy consumption to the available energy generated As further seen in FIG. 2, each Control Center 150 comprises:

1. A main data processor with an operating system and application software for overall control, including coordinating servers performing specialized functions 210
2. One or multiple redundant Database Servers 152
3. One or multiple redundant Control Servers 156
4. One or multiple redundant Communication Servers 154, using Internet or web, fire walls and routers (as required)
5. Multiple Front End Processors (FEPs) 260 interface a number of peripheral devices (e.g., terminals, disk units, printers, tape units, etc.) to the main data processor or the servers.
6. Billing/Report Server(s) 230
7. Multiple Workstations 240 with multiple displays (as required)
8. One or redundant Uninterruptible Power Supplies (UPSs) 158

Implementation. The system shown in FIGS. 1-3a can be implemented in a variety of ways with current (and foreseeable) computer technology. In one embodiment, general purpose computers, such as microprocessors, personal computers or servers are provided at control nodes and networked together to provide the processing and communication required by the system as described above. For cost effective processing power and data storage at or adjacent loads, embedded microprocessor modules may be used. Thus, RMC's 114a, 114b, 115a, 124 and RMS's 112, 122 in FIG. 1 may be built with customized or off-the-shelf microprocessor-based systems, including programmable logic controllers and PC and PDA type systems with networking capability. The Control Center 150 may require more computing power and thus comprise a networked cluster of servers.

Remote Management Controller (RMC). As best seen in FIG. 4, in one embodiment, the components of a microprocessor-based RMC 114a for control of electrical energy include:

Surge Protection Module 1—The surge protection module 1 is designed to protect all the electronic equipment against surges in the RMC, voltage spikes due to lightning and other inherent phenomena associated with power systems and networks.

Measuring Module 2—The measuring module 2 (RMU) measures the three phase voltages and currents (shown as inputs v1, v2, v3, Neutral and CT1, CT2 and CT3), and the phase angle between them. From these measurements the following are calculated, using software on the microprocessor 10:

a) Real Power KW
b) Real energy KWH
c) Reactive power KVAR
d) Reactive energy KVARH
e) Apparent power KVA
f) Apparent energy KVAH
g) Power Factor
h) Power quality (including supply weakness indicators)
i) Energy profile graphs In addition, one or more of the following values or conditions may be sensed or computed: Per Phase WH, Per Phase VarH, Per Phase VaH, Per Phase RMS Current, Per Phase RMS Voltage, Frequency, Waveform capture of all Currents and Voltages, Under Voltage Detection, Over Voltage Detection, Over Current Detection, Phase Failure Detection, Phase Sequence Error Detection, Reverse Power Detection, and Sags and Dips Detection.

As noted elsewhere, both instantaneous values for the above measurements and values of the above measurements taken over integration periods or several seconds to several minutes (in one embodiment 5-20 minutes) or hours may be measured by the RMU and lead to various calculated usage rate indications.

Signal Conditioning Module 3—The signal-conditioning module 3 converts/conditions the 3 phase current transformer (CT1, CT2, and CT3) currents into a value as required by the measuring module 2.

Power Supply Module 4—The power supply module 4 takes power from all the 3 phases of the alternating supply and converts it into DC. It is then chopped down to the voltages as required by the RMC's electronics, keeping these voltages constant and clean of any interference.

Memory Module 5—The memory module 5 consists of different types of memory as required by the application and can vary in size to accommodate the control programs and different applications. The memory module 5 communicates with and is under the control of the Microprocessor 10.

Clock Module 6—The clock module 6 provides a precise time orientation for the microprocessor and also for coordinated scheduling of loads pursuant to an operating plan.

Button Interface Module 7—The button interface module 7 is a simple set of user input controls. For more complex user interfaces, this module may be a full keyboard, not just a limited set of buttons. These controls allow navigation of menus present on the Display Module 12.

Input/Output Module 8—The Input/Output Module 8 provides the physical connection point for sensors and may also provide a connection point and for the communication channels 118 and 119, if wired.

Power Line Communications Module 9—The Power Line Communications Module 9 provides a means for the microprocessor 10 to use existing power lines as a communication channel, which may be useful to avoid additional wiring at a user site.

Microprocessor Module 10—The microprocessor module 10 supplies the instruction processing and other digital processing functions for execution of stored programs used by the RMC. A suitable microprocessor is the Model ATMEGA 128 from Atmel Corporation.

Radio Transmitter/Receiver Module 11—Radio Transmitter/Receiver Module 11 provides RF communication of data to/from the microprocessor 10, should that be needed instead of or in addition to the power line communication. A suitable Radio Transmitter/Receiver Module 11 is the Zigbee type CC2430 chip from Texas Instruments Corporation.

Display Module 12—The display module 10 is an LCD or similar display to present information about the RMC's functions, the information it is sending, receiving or processing and to provide control menus to the user.

Serial interface Module 13—The serial interface module provides one more channel for communications to and from the microprocessor 10, particularly useful for attaching certain laptops or test equipment for temporary monitoring or configuring. It also accommodates other devices using a serial interface.

Antenna Module 14—The antenna module is part of the Radio Transmitter/Receiver Module 11.

Remote Management Server (RMS). The RMS can be constructed from off-the-shelf equipment or can be a proprietary design. As best seen in FIG. 5, the components of a microprocessor-based RMS 112 for control of electrical energy include:

Surge Protection Module 501—The surge protection module 501 is designed to protect all the electronic equipment in the RMS against surges, voltage spikes due to lightning and other inherent phenomena associated with power systems and networks.

Power Supply Module 502—The power supply module 502 takes power from all the three phases of the alternating supply and converts it into DC. It is then chopped down to the voltages as required by the RMS' electronics, keeping these voltages constant and clean of any interference.

Memory Module 503—The memory module 503 consists of different types of memory as required by the application and can vary in size to accommodate different applications. The memory module 503 communicates with and is under the control of the Microprocessor 510.

Mini-PCI Type III Sockets 504, 505, 506, 507—Four of these connectors are shown for receiving various peripheral devices.

Compact flash Socket 508—This provides a connection point for the secondary memory use to store the RMS data and software.

Radio Transmitter/Receiver Module 509—Radio Transmitter/Receiver Module 509 provides RF communication of data to/from the microprocessor 10. A suitable Radio Transmitter/Receiver Module 11 is the Zigbee type CC2430 chip from Texas Instruments Corporation.

Microprocessor Module 510—The microprocessor module 510 supplies the instruction processing and other digital processing functions for execution of stored programs used by the RMS. A suitable microprocessor is a low power consumption microprocessor such as a Pentium III from Intel Corporation or the Geode chip from AMD.

Ethernet 10/100 PHY 511, 512—two of these connectors 511, 512 are shown for LAN, internet or other network connection to other computers including related servers.

Clock Module 513—The clock module 513 provides a precise time base for the microprocessor and also for coordinated scheduling of loads pursuant to an operating plan.

RS-232 514, 515—two of these connectors 514, 515 are shown for communication with a laptop used for configuring, or with a modem or other serial communication devices.

DIO 516—These are ports for sensor input signals, such as for temperature, vibration, speed.

JTAG 517—This provides an access port for testing and diagnostics.

Control Methods. FIG. 7 shows a high level flow diagram for configuration and operation of the resource management system. As a first step, the system provider analyzes a user's production/output/enterprise objectives, the loads that are used to achieve these objectives (including load profile information) and the user's past resource use. In this analysis opportunities can be identified for reducing resource use or operating levels and shifting use to reduce peaks and fill valleys relative to control goals. Out of this process come defined overall operating plans and control goals and particular operating plans and control goals for each system control node. In most cases these will require coordination among nodes, so the appropriate control messages are defined as part of defining the operating plans and control goals for each system control node. This permits the hardware configuration for the RMC's, RMS's, and control center control nodes to be defined and the hardware installed. The result is a map of components similar to FIGS. 1 and 3. The power lines provide a tree-like structure that ends in various loads. The control channels show the network for flow of the information used in monitoring and control.

With the hardware in place, the system provider can install operating plans and control goals in memory and/or secondary storage at the RMC's, RMS's, and control center. After testing of hardware with the load level and group level control programs, load operations per the operating plans begin. This includes both start up phase plans and ongoing, more steady-state production/output plans. The various control nodes measure resource usage and monitor these levels against operating plans and control goals at each of the control levels:

RMC/load level; RMS/group level; and control center. While the system as defined has bandwidth limitations that make some autonomous operation desirable, there are message interchanges between nodes to permit coordination of the control goals at the multiple control nodes and control levels. Also, each node monitors operating conditions in and around it, to the extent these conditions are relevant to following and adjusting parameters of operating plans and achieving control goals. Thus, the load controllers/RMC's, the group level controllers/RMS's and the control center monitor and control their various input ports for receiving sensor or status data and control messages. The processors at the various control nodes execute the controller computer programs to apply the operating plans and control goals sets. They may then adjust load operating levels responsive to measured resource usage levels, load status and other inputs and control messages, operating plans and control goals to reduce, shed, or add loads and to introduce generation resources. On an ongoing basis, and consistent with available bandwidth, the control nodes communicate relevant node status messages to other nodes that are part of an operating plan or control goal involving multiple control nodes. The various control nodes also monitor and implement updates to operating plans and control goals that are developed by local or remote optimizer modules. The measuring, monitoring, adjusting and communicating functions are implemented in one or more loops for continuous control of operations. For simplicity, FIG. 7 shows a single loop, but implementations would typically have several loops, nested so as to permit frequent measuring of the parameters requiring tight monitoring and control. As data from each of the various control nodes is collected, a database 152 is filled at control center 150. The database 152 may be subjected to data mining that is useful to identify waste for removal by revision of existing operating plans.

Figure 10:
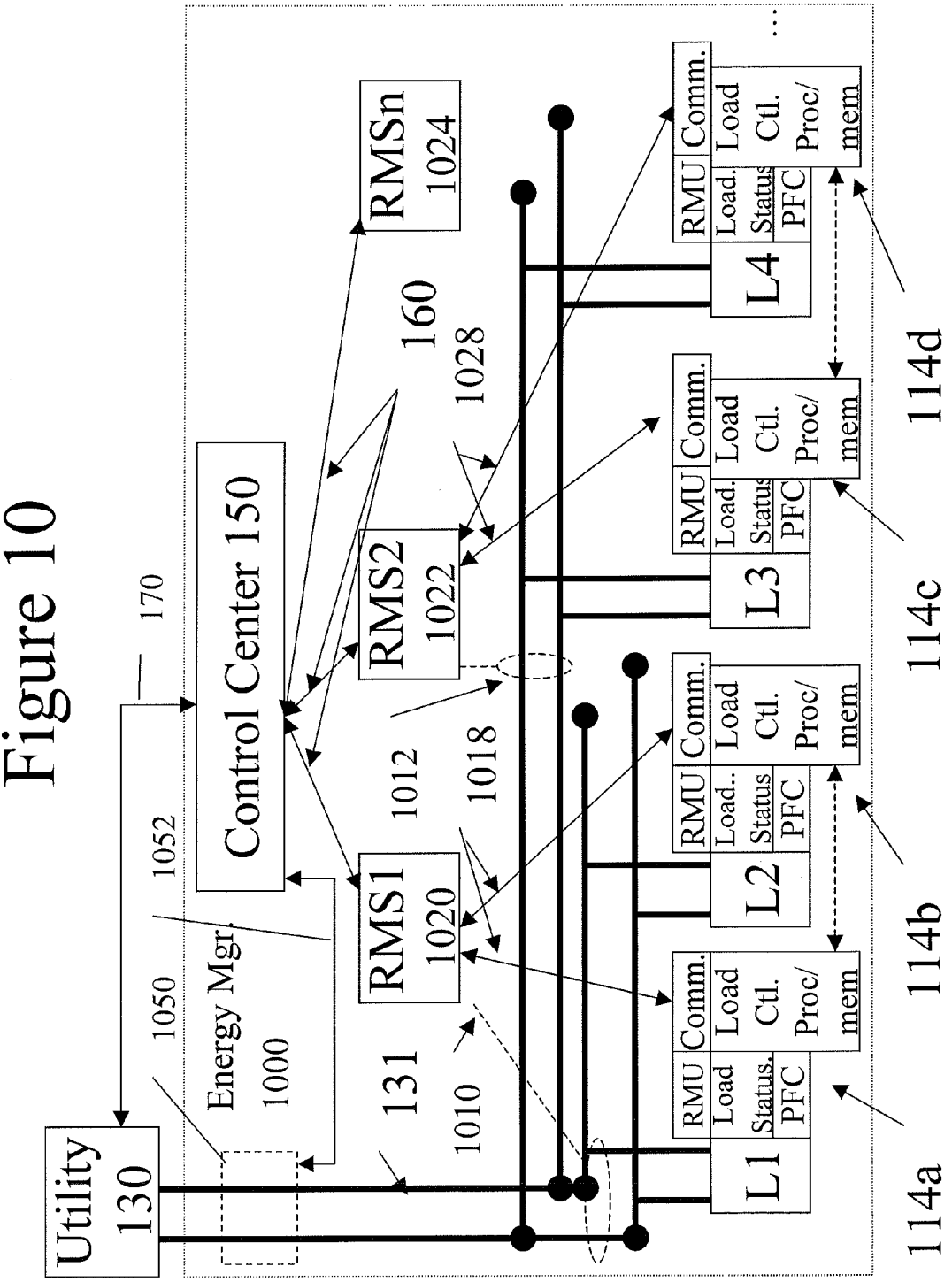
FIG. 10 is a schematic block diagram of a system for electrical power management with two remote management servers (RMS) and multiple remote management controllers (RMC) showing the power delivery lines to loads and the communication channels and controller components for an energy management system.

FIG. 10 shows another view of a resource (energy) management system 1000 as shown in FIG. 3a. Here utility 130 provides electrical power as a resource on lines 131. The power may be delivered at high voltage levels to a transformer 1050 or other item of local distribution equipment at the user site. (This equipment may be utility or user owned and may be monitored over channel 1052 by control center 150 or alternatively by an RMS.) Loads L1 and L2 receiving power from lines 131 are part of a control group under RMS1 1020. Loads L3 and L4, also receiving power from lines 131, are part of a similar control group under RMS2 1022. Loads L1 and L2 are each shown as having an associated load level intelligent controller, RMCs 114a, 114b. Loads L3 and L4 each also have an associated load level intelligent controller/RMC 114c, 114d. Each RMC has a processor and includes a resource measuring component (RMU) for measuring the rate of use of the resource by the associated load, including measuring at least one of an instantaneous usage rate and a usage rate over an integration period and (in one embodiment) measuring one or more supply weakness indicators; a load status component for receiving load status data for the associated load; a communication component for receiving control messages from and sending load status messages to other associated controllers; a memory for storing a load control goal set and a load operating plan; and a load level control computer program responsive to the resource measuring component, the load status component, the control messages from other associated controllers, the load control goal set and, the load operating plan to determine a load operating level for, and provide control commands to, the associated load. As can be seen, because the RMC is connected to other controllers, the memory may hold only a working portion of the load control goal set and load operating plan. The working portions may be received as needed from other control nodes, where storage in memory is limited or the data stored need updating.

Above RMS1 and RMS 2 in the control hierarchy is Control Center 150. Each of RMS1 and RMS2 has the ability to monitor the power flowing into its load group with a group level RMU shown symbolically at 1010, 1012. Thus, for power consumption audits and power factor control, each of RMS1 and the RMC's at L1, L2 may collect data on power factor as viewed at their particular node. (Similar data is available for RMS2 and the RMC's at L3, L4.) The RMC at each of L1 and L2 has a power factor controller module (PFC), which receives control signals from the RMC for L1 or L2 to connect/disconnect power factor adjustment elements (e.g., capacitor banks) that may be used to improve the power factor. Although the power factor controller 380 of FIG. 3a is not shown in FIG. 10, a power factor controller under control of RMS1 or RMS2 may perform power factor correction at its level of the control system.

FIG. 10 also shows RMSn to indicate that essentially any number of RMS's may be present in a system. Control center 150 provides supervisory control over RMS1, RMS2, . . . RMSn 1020, 1022, 1024. Thus, if each RMS represents a different site for one customer, control center 150 may provide control for that customer that balances the operating plans and control goals at each of its sites. If RMS1 and RMS2 are at different sites for one customer and RMSn is a site of a second customer, then control center 150 is positioned to do control management for each customer separately, pursuing the separate operating plans and control goals for each customer. In addition, by contract with each customer, the control center 150 may have the right and/or obligation to perform optimization with both customers in mind and agreed terms of exchange (Market Module/Rules 270 in FIG. 2) if one customer gives up a controlled portion of its resource access to provide more of that resource to the other user, while the control center 150 remains consistent with its control goals.

FIG. 10 also shows the communication channels that permit data and control messages to be moved between and among control nodes. These channels may be wired, wireless (RF, microwave or other) or signals overlaid on power lines. As seen in FIG. 10, channels 1018 connect RMS1 to its associated RMC's and channels 1028 connect RMS2 to its associated RMC's. Further channels 160 connect RMS1, RMS2 and RMSn to the control center 150. Arrows with dotted lines show that in some embodiments, the loads in a group (e.g., L1, L2) may also have a direct communication channel. FIG. 10 also shows communication channel 170 between utility 130 and control center 150.

Control Examples. To further understand how the various levels of RMC's, RMS's and control center 150 as shown in FIG. 10 implement the overall control functions discussed in connection with FIG. 7, it is helpful to consider three categories of loads and some examples of control actions that provide energy cost savings. The three types of loads are: (A) loads that a control system may freely shed or adjust; (B) loads that a control system normally can shed or adjust only subject to a set of control constraints that protect the load and/or the user objectives; and (C) high priority or essential loads, such as life support systems or all or portions of medical or public safety related facilities, which are normally not shed. In normal situations, the present system will address issues by controlling power consumption at load types A and B, and simply preserve delivery of power to loads of type C.

Spinning reserves are sized to accommodate unknown contingencies and the speed with which those contingencies are handled. Contingencies occur all the time due to weather condition, equipment failure, etc. However, if the response of the load control is sufficiently fast, the size of the spinning reserves can be reduced significantly. This means that less efficient equipment can remain in an off state, reducing fuel consumption, reducing environmental pollution, etc. The present system proposes an extremely fast demand control solution that pre-allocates blocks of current loads, allowing the shedding of blocks of loads (1 MWatt, 2 MWatt, 5 MWatt, etc) in sub-second intervals using group broadcasts to nodes. The loads that constitute the block loads are dynamically allocated based on real-time load measurements. Loads are allocated by priority, area and previous (historical) load shedding. Loads may not be disconnected immediately after receiving the group command. A random delay may be introduced to ensure that loads are disconnected in a controlled fashion, thereby preventing any network instability, such as oscillations that might be caused by a sudden interruption of load.

The following are examples of control strategies available to an RMC, an RMS and/or a control center in the present system. They show the flexibility of a multi-control node network organized according to the principles taught in this application. However, other strategies may be implemented with the same basic components, depending on the user's particular loads, environment and objectives.

RMC Control Examples. An RMC can keep a type A load within its allocated energy consumption by following the load operating plan and monitoring the changes in energy consumption that occur as the operating program for that load is executed. The RMU measures energy use over some integration period that reflects steady state usage levels. If the amount of energy in-flowing begins to approach the load level limit, the RMC can use any available operating level adjustment options to reduce the load's energy consumption, such as reducing motor speed to continue an operation at a lower rate, cycling an air conditioner compressor on and off while staying near a comfort goal, or, for a cumulative process based on electrical current (e.g., plating) reduce the current and extend the production schedule in the operating plan so that the desired amount of plating is spread over a longer time. When necessary, the type A load can also be shed completely. In some cases a type B load can be part of this same RMC control strategy, but, for a type B load, any action, such as cycling on-off, has to be consistent with the control constraints for the affected load, which are made available to the RMC control program if it controls a type B load.

Another strategy that an RMC may execute responds to a current energy consumption measurement, and also uses load profile data, the operating plan and local production/output/ enterprise objectives to displace load activity to an earlier or later time frame, during which that load has a greater allocation of energy under the governing control goal set. For example, if it is clear that to meet an operating plan or control goal a load such as a freezer must have little or no energy consumption in a peak period of use of other loads to occur in two hours hour, the RMC control program can determine that the freezer might be operated at a higher level or continuously until the required low/zero consumption period. This will lower temperature in the freezer sufficiently that the temperature rise necessarily occurring in the required low/zero consumption period will not reach the high temperature limit that damages frozen goods. Such displacement functions may be performed by the load level control programs changing the operating plan, such as at the RMCs 114a, 114b, 114n in FIG. 10, within the operating range of the load that each controls. This advanced start strategy can be useful for those loads where the early energy input has a persisting effect (either in the load itself or in the environment it effects), one which lasts into the later period when energy use needs to be limited (persisting effect load). The loads controlled with this strategy may be type A or type B, consistent with the control constraints for the type B load.

If the operating plan for an RMC calls for a particular operating level for a load and there is no need to adjust that operating level by reason of an energy control goal, the RMC's control program may nevertheless take actions responsive to certain load status data. Such data may include sensed data about the load, such as speed, pressure, temperature, vibration, number of certain repetitive operations, acceleration, on/off duty cycle and efficiency measures. Depending on the status data item and its acceptable ranges as defined in load profile data, the control program for the load may adjust the load or shut it down, if damage to the load device or other adverse consequences are indicated by the load status data.

The RMC may also receive and respond to environmental data that is sensed at the load or communicated to the load. For example, an expected cold spell might lead to a change in the operating plan for heating equipment that is a persisting effect load, such that it would be turned on earlier in a low rate period, to build up heat in a building or in outdoor process equipment, to reduce later increased input of energy for that heating load that is predictable based on the expected cold spell.

If an RMC is provided a load's expected start up instantaneous energy use pattern, it can monitor the actual start up instantaneous energy use pattern and compare it to the expected use pattern. A deviation from the expected start up pattern that leads to higher instantaneous energy use may initiate the RMC control program to send a message to an RMS, which may respond with an error or maintenance message to system operators and/or by shifting the start-up of this load to a different time frame, so that the peak resulting from start-up will rise from a different, lower base level and not be so high.

When an RMC measures power factor over some integration period that reflects steady state usage levels, and the RMC finds that the power factor is unsatisfactory (e.g., less than 0.96), it may introduce power factor control elements that adjust the power factor as observed at the load to unity or a level that helps avoid any utility-imposed penalty (keeping in mind that the utility will measure power factor for the entire user site).

Further, the control program at an RMC offers the fastest route to load shedding when that is time-critical. For example, where the RMC has an RMU with the ability to sense supply weakness from measurements (e.g., rate of decline from standard supply frequency values) made at the load, the RMC control program can take immediate action to adjust or shed the loads it controls. Although an RMC may also receive a warning or control message from other supply weakness sensors not located at the load or from a utility, these may not come fast enough for the RMC to take action to relieve system stress. There may be critical timing in shedding a load to avoid stress responses or damage in the load or the transmission system. Load weakness sensing and direct load shedding action by an RMC avoids delays inherent in transmitting and receiving a message and taking the shedding action. Such direct action may be necessary to head off an overload situation that may arise in fractions of a second or a few seconds.

RMS Control Examples. Because an RMS controls a group, it will measure the total power going into the loads in its control group. If that total power (measured over some integration period that reflects steady state usage levels) deviates from the operating plan or approaches a control goal limit, the RMS control program may respond by sending control messages causing one or more RMC's to reduce operation or shed its load. When the RMS has two or more RMC's with associated loads and they are type A or B loads, the RMS has more control options. It can use messages to certain RMC's to reduce the operating rate of two coordinated loads by some fraction that preserves their working relationship. Or it may recognize that one load is more adjustable than another and fine-tune its operating level by messages to one RMC that achieve just enough of a power consumption reduction. When a control goal so requires, the RMS can send shedding or operating rate adjustment messages to one or more RMC's to turn off or adjust the rate of the associated loads. With operating profile data and operating plans that reflect user operational goals, the RMC can optimize a power consumption reduction with any combination of shedding and load adjustment actions that provide the desired reductions relative to the governing operating plan and/or the group control goal set and fit any control constraints for the type B loads in the load group. For example, the RMS may apply a strategy of cycling several loads on and off in sequence to reduce the consumption of that load group for a period, or it may find two equivalent loads, such as air conditioner compressors, that serve one objective and use only one of them at a time, although together during the defined period they get enough power to largely preserve a user-defined comfort goal.

Although in most cases an RMC will be used to reduce operating levels and keep a load's power consumption consistent with a load level operating plan, for an RMS there may be opportunities to increase a load's power consumption. These opportunities arise when an RMS's load group is operating sufficiently below its group control goal set and there may be a value to the user in increasing consumption, for example, increasing production at one load when there is a known production backlog at that load and its point in the production process. If the opportunity arises in a maximum cost period (highest utility rates), the RMS can calculate whether the value of the increased production or output is worth the cost of increased power consumption. In a lower rate period, there is a greater chance that the increase in production will provide a cost-effective benefit. Properly configured, the RMS can recognize and evaluate the opportunity using rate rules 330 (see FIG. 3a) and analyzing operating plans and load profile data. With rate rules that fully reflect the utility-user rate agreement, the RMS can compute for any given period and planned operating plan the expected billing. If an increase in consumption makes economic sense, the RMS identifies the available power relative to the group control goal and then sends a control message to one or more RMC's, causing one or more to increase its load's operating level by drawing on some or all of the available power (i.e., approximately the difference between the current power consumption level and the control goal limit for the group).

FIG. 13 shows a highly simplified example of a opportunity to increase the operating level at one load, when power demand is lower than anticipated relative to an operating plan and/or a control goal at another load. As shown in FIG. 13, a load L1 may have a control goal with a maximum (steady state) consumption level depicted by light, solid line 1312, which varies over three time intervals shown in the horizontal scale. The light dotted line 1310 shows in simplified form the consumption level for L1 based on its operating plan, which is below the control goal 1312 in all time intervals shown in the horizontal scale. In the middle interval, between T1 and T2, the difference (denoted 1340) between the consumption level expected from the operating plan and the control goal for L1 is significant. For this example, we assume from the operating plan that consumption at L1 will remain at this reduced level throughout the middle interval T1 to T2.

In the upper part of FIG. 13 is the comparable information for another load L2. Here the load L2 has a control goal with a maximum (steady state) consumption level depicted by dark, solid line 1332, which also varies over three time intervals shown in the horizontal scale. The dark dotted line 1330 shows in simplified form that the consumption level for L2 based on its operating plan is just below the control goal 1332 in all time intervals shown in the horizontal scale. An RMS controlling the RMC's for the two loads, L1, L2 and having access to relevant rate rules 330 (see FIG. 3a), operating plans and load profile data, can recognize that the difference 1340 represents power that can be used at L2 without violating the aggregate maximum control goal, represented by the sum of the control goals for L1 and L2. Thus, in the middle interval, between T1 and T2 in L1's operating plan, an amount of power equal to the difference 1340 can be consumed at L2 by increasing its operating level to the extent permitted by making that difference 1340 available at L2. The light and dark double dotted lines at the top of FIG. 13 show that in the interval between T1 and T2, the difference 1340 can be used as added power 1350, with the consumption level per an adjusted operating plan for L2 remaining below the adjusted control goal created by the RMS and communicated to the RMC for L2. Note that because L1 has a slightly shorter interval between T1 and T2 than the full middle interval T1 to T3 for load L2, L2 does not enjoy the added power 1350 for the entire middle interval T1 to T3 in the L2 operating plan. Nevertheless the low level of consumption foreseeable at L1 provides a significant opportunity to permit L2 to operate at a higher rate.

As with an RMC, which may look forward in an operating plan, identify a persisting effect at a load and use that information to move forward a scheduled start time for a load, to avoid a foreseeable, later threat to a load level control goal, the RMS can do the same thing with a group level control goal. Again, the RMS has its entire control group of type A and type B loads to use in formulating the advance start strategy. For example, the RMS may use in the strategy the loads known to have a greater persisting effect from use of power, because of the storage nature of the load. Thus, a freezer that is seldom opened (e.g., only by service personnel), may hold a lowered temperature longer after it is achieved, than a similar freezer that is constantly being opened by consumers. The former may be a better candidate for displacing power use to an earlier time period to lower its temperature. The RMS can store and use data on the persisting effect characteristics of its group of loads. Thus, the RMS can identify which loads have little persisting value from accelerated energy consumption or which lose whatever value they have very rapidly. The data can be represented by a set of rise and decay curves. The curve data can show which loads are less useful in an advance start displacement strategy that moves a load's resource consumption to an earlier period, so as to avoid a peak period.

Although an RMS primarily controls with group operating plans and control goals leading its computations, it may also monitor parameters that matter to one or more individual loads. As with the RMC, these may be parameters that reflect the status or condition of the load or its environment. For example, the RMS may monitor the ambient temperature in a room filled with loads that are heat sensitive. The RMS may then send messages with data of interest or control commands to any RMC in the RMS' control group. An RMC may also monitor the key load status parameters of one more loads, to see if these are within the acceptable limits. If one or more of these parameters is outside limits as measured at the RMS, the RMS again may send a message with data of interest or control commands to the affected RMC.

The RMS can be particularly helpful in controlling high instantaneous peak power levels. As noted above, these occur most frequently at load start-up. The RMU at an RMS can measure these, because they are visible in the power lines monitored at its level, and the RMS can receive from RMC's reports of actual instantaneous peak power levels as measured at specific loads. The RMS can then plan and execute a start-up sequence that monitors instantaneous peak power levels. For example, if loads X, Y and Z all need to be started up in order to work together, the RMS will first formulate an operating plan that defines the order of start-up and has controls that keep the start-up sequences from overlapping. Then, the RMS can perform the start-up sequence and monitor instantaneous peak power levels. These permit the RMS to observe at its level the group power consumption, including the added spike caused by a particular load that is undergoing its scheduled start up. With good information about the expected start-up spike profile, the RMS can observe that all start-up sequence transients from that load are past. Then, the RMS may immediately start the next load in the sequence. In this way, the RMS can reduce or eliminate the overlap and accumulation of instantaneous peak power levels from loads, X, Y and Z, so that the instantaneous peak power level demand the utility observes and uses for billing is reduced relative to the instantaneous peak power level that may arise from overlapping starting sequences.

The RMS can also play an important role in achieving power factor goals and reducing or avoiding utility-imposed penalties for bad power factors. The RMS may control an entire site or just a load group at a site. It can monitor power factor for power flowing into all the loads under it, directly or by reports from individual loads/RMC's. With this information, the RMS can address power factor problems. Again, it has available for its power factor control strategy all of the loads under its control and their associated power factor control elements, as well as power factor control elements existing at the RMS. In some cases, the RMS may be able to select loads with offsetting power factor characteristics. In other cases, the RMS will simply measure from time to time the power factor at one or more control nodes where there is available power factor correction equipment and use its control over multiple nodes to construct a unity power factor profile as seen at the RMS, or at least a power factor above the level at which the utility applies a penalty.

Control Center Control Examples. The control center 150 also can employ strategies to make power consumption more efficient, as viewed across all the RMS's that are controlled by the control center. The control center 150 can perform essentially all of the control tasks described above for an RMS, but it typically has more options for developing a strategy to achieve a control goal. It can deal with each RMS as a unit and adjust the operating plans at the RMS level. It can also use more detailed, load level information and communicate control messages down through the RMS's to individual RMC's. Although there is increased complexity and there may be some bandwidth limitations that make it difficult to construct control loops with quick response times, the control center 150 (in theory at least) has all type A and type B loads under control of the RMS's governed by the control center 150 available as controllable units to adjust load operating levels and to shed loads. Thus, where one control node has a control goal problem or needs a change in operating plan, there are many other control nodes in the network that can be evaluated at the control center 150 as a possible part of the solution. This may require significant computing power to examine many combinations, but with computer monitoring of resource use and control of many nodes. solutions derived from and responsive to the various operating plans, operating profile data and control goals can be formulated and implemented.

In some instances, as with an RMS, the control center strategy may also involve increasing resource use at some load, where one load group is operating well below its operating plan or control goals for some reason (e.g., slowdown in orders that causes a slowdown in production; unseasonably cool weather on one area that reduces air conditioning power needs; labor or component availability factors limiting production) and another load group would like to expand its power use beyond its normal control goals. If there is available resource capacity and no higher level control goal violation, then the control center can reallocate resource use among groups and/or users for some predetermined period of time. As can be seen, when the service provider uses a control center 150 to make an overall, multiple user usage level commitment or billing arrangement with a utility, the control center 150 becomes the important means to achieve that.

More specifically, where a user has more that one site and more than one RMS, the control center can modify operating plans to use the advanced start-up strategy discussed above to do peak reduction and valley filling for the aggregated steady state power consumption of the one of more sites. In addition, the opportunities for reduction of instantaneous peak power levels may become greater for a multi-site user, if the instantaneous peak power level on which the user's billing is currently based has been established without coordination of load start-up times. The control center 150 can formulate an operating plan that defines the order of start-up for all loads at all sites and (with sufficient messaging bandwidth in channels 160) has controls that keep the start-up sequences from overlapping. Then, the control center 150 can cause the RMS's under its control to perform the start-up sequence and monitor instantaneous peak power levels. These permit each of the multiple RMS's to observe at its level the group power consumption, including the added spike caused by a particular load that is undergoing a scheduled start up, and to communicate that to the control center 150. With information about the start-up from each RMS, the control center 150 can observe when all start-up sequence transients from each load are past. Then, the control center 150 can direct the applicable RMS to start the next load in the sequence. In this way the control center 150 working with multiple RMS's can reduce or eliminate the overlap and accumulation of instantaneous peak power levels, so that the instantaneous peak power level demand that the utility observes for the user across all the sites and that it uses for billing is reduced relative to the instantaneous peak power level that may arise from random or unplanned overlapping start-up sequences.

The control center 150 also may have a better overview of trends of power usage that will require control intervention. For example, the control center may discern a trend toward increased power consumption at a first site and review its operating plans and control options at other sites to see if there is a broader problem that needs early intervention or, perhaps, a second site with a lower consumption trend that might be used to offset the increased power consumption at the first site.

Data Structures. FIGS. 11 and 12 show schematically simplified examples of how the parameters used for control at a load level control node (load controller, RMC) and at a load group level control node (group controller, RMS) may be defined and analyzed for purposes of specifying operating plans and control goals. In FIG. 11 a table appears that lists in the first column a number of parameters that may be measured at a load or measured elsewhere and communicated to a load controller/RMC. As seen in the second column, some of these parameters are the subject of control goals (steady state power consumed by load, power factor) and thus are continuously monitored for consistency with part of the control goal set defined in this second column. As seen in the fourth column, other parameters are relevant to the operating plan and the subject of some exception condition or adjustment action defined in the operating plan, which may provide for a responsive action of the RMC. It may be helpful to view all of these parameters together in a data structure as shown, because all are part of the RMC control program, and the pursuit of an operating plan and the failure of a device to follow anticipated results of an operating plan may be relevant to the pursuit of a control goal. As seen in the third column, some of the parameters are communicated by the RMC from the load level to another control node; in the example of FIG. 11, communication flows up to an RMS. Where parameters are of local interest only, i.e., significant to the load but not used elsewhere, the table notes that.

For the measured parameters that are subject to a load level control goal, the second column indicates how the control goal may be specified. For example, the steady state power to a load may be monitored by comparison to a high limit that reflects the maximum power input permitted to the load, at least without an exception permitted by a higher level of control or providing an operating plan that overrides the control goal. Similarly, a low power level limit for a load may be used as part of control, to identify if a device is being underutilized or has some defect, requiring a notice. The collection of values that are subject to control correspond to the control goal set for the load controller, which as noted above, can have multiple dimensions.

The power factor variable is shown as having only a low limit. For some loads, an near perfect power factor is hard to achieve, so intervention with a power factor controller is only called for at a value recognized as low for that load type or at the lower limit that triggers a utility penalty or losses become too high.

The supply weakness index has been discussed above as a stimulus for emergency load shedding. Here the load controller can do nothing to control the value measured, but it can take a quick shedding action that may help the utility recover. The device temperature, pressure, etc. and counter data shown in FIG. 11 are all load status data items that are typically not part of a control goal feedback loop but may be useful inputs to an operating plan to initiate adjusting an operating level to current conditions or to execute a shedding operation or message reporting load status.

An instantaneous view of device start-up may be of interest at the RMC, not because the power level in start-up spikes can be controlled, but for a different kind of response. The instantaneous start-up pattern can be monitored relative to a benchmark and used to determine if the device is developing some type of defect. The defect may lead to a notice and to a maintenance intervention.

In FIG. 12 appears a table that lists in the first column a number of parameters that may be measured at an RMS/load group controller or measured elsewhere and communicated to the group controller as inputs to its control program. As seen in the second column, some of these values are the subject of RMS group level control goals (power input to load, power factor) and thus are continuously monitored for consistency with the RMS load group control goal set. As seen in the fourth column, other parameters are relevant to the group operating plan and the subject of some exception condition or adjustment action defined in the operating plan and which may provide for a responsive action. As with the RMC/load controller, it is helpful to view all of these variables together, because all are part of the RMS control program, and the pursuit of an operating plan and the failure of a device to follow anticipated results of an operating plan may be relevant to the pursuit of an RMS control goal. As seen in the third column, some of the values may be communicated from the RMS/group level to the user's ERP or to another control node. Where values are of local interest only, i.e., significant to the local group controller but not elsewhere, the table notes that.

For the measured parameters that are subject to a control goal, the second column indicates how the control goal may be specified. For example, the power to a load group may be monitored by comparison to a high limit that reflects the maximum input power that is permitted to the load group, at least without an exception permitted by a higher level of control. Similarly, a low level limit on power to a load group may be used as part of control, to determine if a group of devices is being underutilized or has some defect, requiring a notice. Underutilization for a load group may indicate an opportunity to add load or sell or trade over-capacity. The collection of values that are subject to control as shown in FIG. 12 correspond to the control goal set for the RMS/group controller, which as noted above, can have multiple dimensions.

As with a load controller, the power factor variable is shown as having only a low limit. For some groups of loads, a near-perfect power factor is hard to achieve, so intervention with a power factor controller is only called for at a value recognized as low for that load group type.

The RMS/group controller may monitor external ambient temperature, which, of course, it cannot control, and track forecast temperatures. These values may be of importance for making changes to an operating plan. For example, it may help provide advance start-up for heating and cooling, by scheduling load activity outside of peak periods, but where the power input has an effect that lasts into peak periods.

The RMS/group controller has the ability to oversee contributions from multiple loads that may be part of an operating plan governing sub-processes leading to a higher level production/output goal. Thus, some of the measured parameters are relevant to an operating plan if they are to low, even if there is no control goal that will work to improve the measured value. Also, some of these values are of interest to programs running on a customer's ERP, so they are passed on to the ERP 380.

Additional System Functions. The system as described above is designed for a service provider to aid a user in more efficient management and use of utility-supplied resources. However, the information produced and the information storage and management components present can be extended to other useful activities. These include a utility payment service based on sharing savings, user information and interactive remote control services, utility information and remote control services and user asset management services. However, one or more components of the system could also be installed by a resource consumer for a resource use optimization plan it makes and implements by itself, without a service provider.

Utility Payment Service with Sharing of Savings Against Baseline. Because of the complexity of the present system, it may be difficult to explain to potential users and purchasers. Users may not believe the system can produce savings or may not want to invest in it without a clear idea of what benefits it will produce. To address this, the systems can be configured with additional functionality that makes use of the data collected and the measuring and monitoring of power at various levels, including the overall site level. The system provider will likely study the user's historical records as part of the development of RMC and RMS control programs. From these historical records, the system provider and the user can define one or more historical baselines. The baselines may be actual billings for the same time period in a prior year or may include adjustments for changes in user's production activity or weather. The user and the system provider may contractually agree that the system provider will only earn fees if the system provides the user savings as compared to the historical baseline, and the system provider will take as payment a portion of these savings (calculated by an agreed percentage or other formula), so as to provide an incentive for increasing them.

For example, in one embodiment the baseline may be based on a known billed amount for a specified period for a load or facility that does not vary significantly in resource usage because of weather, changing operating plans or other factors. If the historical resource cost baseline for such a load or facility and a specified period were $10,000 and the use of the herein-described load controllers and group controllers with well-configured control goal sets could drive to $9,000 the resource cost billing for a user for a specified comparable period, the total savings would be $1000 and the user could be billed the actual resource cost billing plus ten percent ($9000 plus $100) or twenty percent ($9000 plus $200) (or actually plus any factor less than 100 percent) of the total savings of $1000.

Under this arrangement, the system provider determines the difference between a current utility bill during the service period and the relevant historical baseline and bills the user for the amount of the actual utility bill plus the agreed and computed savings factor, a percentage of savings reflected in the supplier's current resource use bill as compared to the applicable baseline. The system provider may pay each utility bill before or after receiving payment from the user. The system provider keeps the its percentage of the total savings amount. By careful study of the historical usage levels, the past billings and the savings opportunities offered by the user's particular mix of loads and identified waste situations (resulting from use of one of more levels of the controllers described above), the service provider can develop operating plans and/or control goals likely to deliver savings for most users. The extent of these savings can define the value provided by the system for that particular user and provide a source for compensation for the service/system provider.

In another embodiment, the baseline may be based on average KWH cost in a specified billing. This baseline helps deal with changing operating plans and varying usage levels. Here the baseline might show that for a specified past billing period, the user used 5000 KWH and had an average cost of $0.07 per KWH. If the use of the herein-described load controllers and group controllers with well-configured control goal sets could drive to $0.06 per KWH the average energy cost for a user for a specified comparable period, the total savings would be $0.01 per KWH. If the user used the same 5000 KWH and was to pay the bill directly, the service provider could bill the user a fraction of the total savings of 5000 KWH times $0.01 per KWH or $50. For example, the service provider could charge the user ten percent of savings ($5) or twenty percent of savings ($10) for that billing period or actually any factor less than 100 percent of the total savings of $50 resulting from the reduced average KWH charge in that billing period.

Because the system already measures and collects detailed information about the power (or other resource) used, the system provider can relatively easily make the computations needed to define the difference between a current billing and an agreed historical baseline, with appropriate adjustments for the user's level of activity, so that downturns in user activity (e.g., unit production and sales of some product), which may affect resources consumed, are taken out of the computation. Then only the actual savings provided by the system relative to historical resource consumption costs for a comparable level of user activity will be identified and shared.

FIG. 14 provides a high level flowchart for one form of billing the user, based on the service provider paying the utility bill and billing its customer for this amount plus a computed service charge. (The last two steps would change if the service provide let the user pay the bill and then billed separately after computing the savings. While the flowchart shows payment based on shared savings alone, the parties can combine this with other compensation. For example, the user may pay a minimum base fee per billing period or additional services fees that reflect other value provided by the system, beyond resource consumption cost savings, e.g., a productivity premium if greater productivity can be achieved for the resource consumption at or below baseline levels.

User Information And Interactive Remote Control Services. A user who has the present system installed on its site(s) and loads may wish to access information developed by the system, so that the system can be more effectively adapted to the user's particular requirements. The user also may wish to have some of the automatic control functions of the system subject to override or to adjustment based on the judgment of user personnel.

Because a commercial user's primary interest will usually be in resource costs and balancing costs against the business objectives that are pursued in operating plans, the present system is most useful when it stores or has accessible the billing arrangements for one or more users (e.g., rate rules 330 in FIG. 3a). These may be standard, published tariffs or, more likely for large commercial users, customized, negotiated terms stated in a user-utility contract. (In fact, the system provider may join with the user in the rate negotiations, to help strengthen the user's position that it will have full and accurate data on resource use at the various loads.) With the rate rules stored, the system can use measured resource use data to compute current billings and predicted use information from operating plans to compute expected billings, assuming that a known operating plan is to be followed at one or more loads for the period of interest. Thus, the system can deliver statements of incurred but not yet billed resource costs and "what if" pro form a statements showing anticipated billings of resource costs for defined time periods.

To facilitate the user information and control objectives, the system accumulates resource use and other data of interest from various RMC's and RMS's, storing it at these levels (control nodes) but also passing all or much of it to the control center databases on database servers 152. Here a database management system, such as an Oracle system or similar relational database, maintains the data and provides a wide variety of reporting functions. To make the data and functions user-accessible, the system provider makes available by direct system access at a workstation 310 or by web or other remote access one or more user interface screens that permit the user to navigate through a variety of functions. As seen in FIG. 15, a user interface (display/decision/control) screen 1500 may generally be divided into user reporting functions 1510 and user control/message functions 1520. Under reporting functions 1510 a user may select various reports on consumption rates. These may be selected based on different levels of the system: e.g., Load/Group/User Site/User. In addition, the user may look at data for the current integration period, the prior integration periods and prior days, weeks, months or other time frames. Additional custom consumption reports also may be formulated.

As further seen in FIG. 15, the user has additional screen selections for viewing tariff information and billing information. Because the system may be configured with the utilities' billing rates, including special billing rates and rules documented in a user-utility contract, and has detailed, accurate resource consumption data, the system can calculate billings as accurately as the utility (sometimes, even more accurately). The latter capability permits the user to monitor costs far better than traditional monthly billings. It also permits compilation of projected billings where the only accuracy issue is in the prediction of future resource use based on operating plans.

FIG. 15 also shows user interface controls for reports on asset management. Because the present system tracks all loads it controls and monitors their condition through status data, it collects a great deal of detailed information of the kind useful for an asset inventory. Accordingly, the system provider can use in its load tracking databases the user's equipment identification and link to other user data on such equipment. Thus, the databases in the present system can either become the asset inventory databases for the user or can provide additional information to supplement the user's asset inventory database. FIG. 15 shows under the "Asset Management" heading a number of navigational cues and selections that permit users to access data on loads and also on other assets, when the data for these is either kept on the present system or the present system can link to other databases using communication facilities of the control center 150 or an RMS.

The status data on the load equipment is updated frequently in the present system and provides specific information on actual operating conditions. Thus, it can assist the user in tracking and caring for all its capital or leased equipment, where the user's desired equipment asset inventory overlaps significantly with the loads controlled by the system. For example, data that show the load step or start-up characteristics of a load, which are of interest for other reasons discussed above relating to improved operating efficiency and energy cost savings, may be monitored over time. If a load step changes slowly over time, the system may detect this as an indicator of declining condition calling for predictive maintenance. For example, if an air-conditioner load steps are smaller over a few years, the system can predict that the air-conditioner gas is leaking and needs to be replaced. For other assets, the load step increase or decrease over time may be monitored for its diagnostic value as to an impending failure or the need to perform routine maintenance in response to normal wear and tear. Thus, to implement the method, historical load step data are detected and stored. Data mining algorithms are used to find patterns of interest for condition detection. Such patterns may include the slow decline in the magnitude of load step mentioned above or a change in the shape of a load step (instantaneous values) relative to a shape associated with new equipment or with in-specification and properly-adjusted equipment. Simple numerical operating parameters may also be measured and compared to values known to be associated with good or bad equipment operating condition (e.g., as reported by a manufacturer or recorded in a system.)

For example, the data structures shown in FIG. 11, which provide information on a particular load that is of interest to the RMC control programs of the present system, may provide a base record for each piece of load equipment that can be merged with or tied to other inventory records or can be the start of a database of load equipment assets. Each load record used in the present system may be expanded with other data (purchase price, depreciation, repair records, safety records, lease or maintenance terms, security interest, etc.) appropriate for a useful asset tracking system and management system.

As seen on the right hand side of FIG. 15, the screens of the user interface may also include certain control or message functions 1520. These provide a user the opportunity to shape the otherwise automatic control behavior of the system. The user may view various kinds of situation reports and view maps and operating plans that may help an operator make control judgments. The user may then intervene in a selected situation and exercise control over one or more loads. The system provider may choose to take certain precautions to protect against liability for a user's intervention and overriding of the control systems. First, the user will use passwords, authentication means and protocols to ensure that only an authorized operator exercises this control and that the person signs off in an identifiable way for their exercise of a control option. Second, the system provider may limit the range of override options or structure the user's exercise of the options to provide any needed warnings of the consequences of exercising an override option.

One important control option arises when a utility negotiates a shedding right that gives a user the choice of accepting the utility's shedding demand or paying a penalty for refusing to let the utility shed one or more loads. In this situation, the user needs to have the ability to calculate the costs that will be incurred it the penalty is imposed, so that these can be balanced against the lost revenue from lost production or other effects if one or more loads are shed and an operating plan cannot be followed for some period of time. A spreadsheet or other device for displaying multiple scenarios with built in computations may be part of the user interface. This permits the user to display and evaluate the options and then to communicate back to the utility its decision, knowing with a fair degree of accuracy the economic impact of its decision. The scenario data permits the user to make and informed decision.

The control/message functions section of the user interface also permits a user to review and issue a variety of messages, including alarms, system notices and utility notices. The user can also initiate messages to the control center 150 or various other control nodes and the control center 150 can pass on messages directed by a user to a utility (or vice versa).

In sum, the system may provide a user interface that presents to a user reporting options to derive reports from data stored in the system databases including: resource consumption measured for loads, resource consumption measured for groups of loads, rates of resource consumption for loads, rates of resource consumption for groups of loads, actual billing from the resource supplier, projected billing from the resource supplier, load status, alarms, and messages transmitted between and among controllers. In addition, the system user interface may present to a user controls to initiate load control actions including: switching one or more loads "off", adjusting the operating rate for one or more loads, adjusting the operating plan for one or more loads to move load operation to a different time, adjusting the operating plan for one or more loads to move load start-up to a different time and making economic choices when resource costs have to be balanced against business objectives.

Utility Information And Remote Control Services. A utility that provides resources to a user that has the present system installed on its site(s) and loads may wish to access information developed by the system, so that the utility gets the benefits of a level of detail it normally lacks about the user's resource consumption. The utility also may wish to exercise certain control functions that are available to it in the system, where, by contract, the utility and the user have agreed that the utility may unilaterally take some action. The system then provides the means for a utility to exercise that control, with much the same power as available to a user As noted, the system accumulates data of interest from various RMS's and RMS's, storing it at these levels but also passing all or much of it to the control center databases on database servers 152. Here a database management system maintains the data and provides a wide variety of reporting functions. To make the data and functions accessible to a utility, the system provider makes available by web or other remote access one or more interface screens that permit the utility to navigate through a variety of functions. As seen in FIG. 16, a utility interface (display/decision/control) screen 1600 may generally be divided into billing report functions 1610 and control options 1620. Under billing report functions, a utility representative may select various reports on customer (system user) consumption rates. These may be selected based on different levels of the system: e.g., Overall/Group/Load view. In addition, the utility may look at historical data. This includes: maximum demand for any integration period, maximum demand for selected time range, instantaneous peak demand for any integration period, instantaneous peak demand for a selected time range, and other data in the database for the system. Further, the utility interface can provide access to billing and payment information, including current billing projected to date, past billing periods and payment records. Additional custom reports of various kinds also may be formulated by the utility personnel. The data can be made more useful by employing graphing functions, also accessible on the utility interface screen.

Because, as noted above, the system, may be configured with the utilities' billing rates and rules and has detailed, accurate resource consumption data, the system can calculate billings as accurately as the utility. Thus, a utility may use the result of system billing calculations observable via the utility interface to check its computations and to anticipate possible billing disputes.

Under the control options 1620 portion of the utility interface, the utility may be provided an opportunity to exercise control over certain user facilities, as agreed by contract with the user and the resource management system provider. As seen in FIG. 16, the utility may select the location where it wishes to exercise an agreed control option. The utility may shed loads or provide notices advising a user of "voluntary" shedding action, e.g., tariff adjustments that may incent a user to take voluntary shedding action. A display of tariff adjustment options may be provided to the utility, based on existing user-utility contracts. Also by contract, the utility may arrange to start up a user's generating capacity (or tap its storage of a storable resource) to feed resources back to the utility for its distribution. The utility's access to generating facilities or stored resources may be automatic, based on a command from the utility directly to equipment or may be exercised by messages requesting user action.

The control options menu 1620 also includes managing messages to and from the utility's customers, which may include outbound control messages in accordance with control arrangements pre-agreed to by the utility and customer, emergency demands for shedding or accepting a penalty tariff, and other general notices. The options also include monitoring messages from a customer-utility reporting component resident, e.g., at the user site, whereby the customer system can provide essentially instantaneous reports on resource delivery outages the customer experiences and/or exception reports from a transformer or other local distribution equipment monitored by a customer RMS or a control center 150. In one embodiment, the messages from the customer-utility reporting component include: outage messages, identifying the loads affected by location and outage start time; and distribution equipment exception event messages identifying the equipment experiencing an exception (complete failure, out of tolerances status, etc.) by location and occurrence time. This permits the utility to do geographical and time correlation of the events reported in the messages with other reported events from the utility customer base, as well as expediting service.

In sum, the system may provide an interface for presenting to a utility reporting options to derive reports, based on data stored in the system databases including: resource consumption by user, resource billing by user, maximum rates of resource consumption by user, rates of resource consumption associated with overloading power lines to provide power to loads controlled by the system, rates of resource consumption associated with overloading transformers providing power to loads controlled by the system, power quality measurements, and messages transmitted by the utility to a user. Further, the system may have a user interface for presenting to a utility controls to initiate actions including: switching "off" one or more pre-agreed loads, adjusting the operating rate for one or more pre-agreed loads, adjusting the applicable tariff, sending load or tariff messages to one or more users of the system and initiating flow of resources from a user's generating facility.

In one embodiment, the system may be implemented as software on any suitable processor with appropriate sensor inputs. Here, the software is provided as an article of manufacture that comprises a computer readable medium having stored thereon a computer program for managing use of a consumable resource using an intelligent load controller at an associated load, the controller comprising: a resource measuring component for measuring the rate of use of the resource by the associated load, including measuring at least one of an instantaneous usage rate and a usage rate over an integration period; a load status component for receiving load status data for the associated load; and a communication component for receiving control messages from and sending load status messages to other associated controllers; wherein the computer program comprises: a load control goal set; and a load control component responsive to the resource measuring component, the load status component, the control messages from other associated controllers and the load control goal set, to determine a load operating level for, and provide control commands to, the associated load.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A system for assisting the supply of a consumable resource used by a plurality of loads of a user receiving the resource from one or more suppliers, comprising:

a plurality of user-located load level intelligent controllers, each associated with at least one user load connected in a supplier network that supplies the resource to loads, each such controller comprising:
- a load resource measuring component for measuring the rate of use of the resource by the at least one associated load and measuring voltage, current and phase angle data for calculating power quality supplied to the at least one associated load of the load level controller;
- a load status component for monitoring load status data for the at least one associated load; and
- a communication component for exchanging control and load status messages with other associated load level controllers and at least one group controller for the plurality of load level intelligent controllers;

a connection for applying user's stored reserves of the consumable resource or user generating capacity to the supplier network, said connection being in communication with at least one load level controller or group controller; and a control computer program executing on at least one load level controller or group controller, said computer program being responsive to a trigger signal directly from a supplier or based on power quality calculations of a load level controller to initiate providing the supplier network access to at least one of the user's stored reserves of the consumable resource or the user's generating capacity.

2. The system of claim 1, wherein the trigger signal is from a supply weakness sensor for sensing weakness in a supplier system for the resource.

3. The system of claim 1, wherein the trigger signal is from a supply weakness sensor for sensing weakness in a supplier system for the resource from a calculation of power weakness indicators.

4. The system of claim 1, wherein the trigger signal is one of a command from a supplier or a message initiated or received by at least one load level controller or group controller requiring user action.

5. The system of claim 4, wherein the trigger signal is a command from a supplier and the access is automatic.

6. The system of claim 4 wherein the resource is electric power and at least one load level intelligent controller has a measuring module for measuring one or more dimensions of electric power flowing either to a user from the one or more suppliers or from a user to the network that supplies the electric power to loads.

7. The system of claim 4 wherein the resource is electric power and the user's stored reserves of the consumable resource comprise means for storing electric power.

8. The system of claim 4 wherein the resource is electric power and the user's generating capacity comprise means for generating electric power.

9. The system of claim 1 wherein the resource is electric power and the load resource measuring component of at least one load level intelligent controller has a measuring module for sensing or computing at least one value selected from the group consisting of: Per Phase WH, Per Phase VarH, Per Phase VaH, Per Phase RMS Current, Per Phase RMS Voltage, Frequency, Waveform capture of all Currents and Voltages, Under Voltage Detection, Over Voltage Detection, Over Current Detection, Phase Failure Detection, Phase Sequence Error Detection, Reverse Power Detection, and Sags and Dips Detection or combinations thereof.

10. The system of claim 1 wherein when the user's generating capacity is started up in an emergency situation, the generating capacity is shut down when the situation has stabilized.

11. The system of claim 1 wherein the group level controller comprises a control program configured to receive a message directing it to deploy user generation capacity or to make its own determination to assist, resource supply to the supplier network.

* * * * *